(12) United States Patent
Paspek et al.

(10) Patent No.: US 11,364,661 B2
(45) Date of Patent: Jun. 21, 2022

(54) PROCESSES AND STRUCTURES FOR RECYCLING CARPET AND PRODUCTS OF SUCH PROCESSES

(71) Applicant: BROADVIEW GROUP INTERNATIONAL, LLC, Elyria, OH (US)

(72) Inventors: Stephen Carl Paspek, Broadview Heights, OH (US); Joseph Edward Bork, Westlake, OH (US); Alan Fredrick Schroeder, Cleveland, OH (US)

(73) Assignee: BROADVIEW GROUP INTERNATIONAL, LLC, Brook Park, OH (US)

( * ) Notice: Subject to any disclaimer, the term of this patent is extended or adjusted under 35 U.S.C. 154(b) by 905 days.

(21) Appl. No.: 15/242,690

(22) Filed: Aug. 22, 2016

(65) Prior Publication Data

US 2017/0305038 A1 Oct. 26, 2017

Related U.S. Application Data

(60) Provisional application No. 62/325,017, filed on Apr. 20, 2016.

(51) Int. Cl.
*B02C 23/08* (2006.01)
*B29B 17/04* (2006.01)
(Continued)

(52) U.S. Cl.
CPC .......... *B29B 17/0206* (2013.01); *B02C 23/08* (2013.01); *B29B 17/00* (2013.01);
(Continued)

(58) Field of Classification Search
None
See application file for complete search history.

(56) References Cited

U.S. PATENT DOCUMENTS 2,633,930 A * 4/1953 Carter ................. B07B 7/08
55/403
4,268,551 A * 5/1981 Moore, Jr. ............. E01C 13/08
156/276

(Continued)

FOREIGN PATENT DOCUMENTS

DE 3343788 A1 * 6/1985 ........... B02C 13/288
DE 4409335 A1 9/1994
(Continued)

OTHER PUBLICATIONS

A. Sekiguchi et al., "Nylon Recovery from Carpet Wastes Through the Pyrolysis Under the Presence of ZnO and the Milling by a Metallic Rolling Machine," 6th Int'l Symposium on Feedstock Recycling of Polymeric Mat'ls, pp. 53-54 (Oct. 7, 2011).

(Continued)

*Primary Examiner* — Jessica Cahill
*Assistant Examiner* — Jared O Brown
(74) *Attorney, Agent, or Firm* — Wentsler LLC

(57) ABSTRACT

Methods and equipment for the recycling of carpet are disclosed that produce a clean fiber product suitable for industrial use. The methods allow the recovery of face fiber material, for example a polyester, polyolefin, or a polyamide, from carpets that includes a face fiber material, a polypropylene backing material, and an adhesive, and include the steps of mechanically impacting the carpet to break the bonds between the adhesive and the fibrous components, treating the fibrous components to remove adhesive granules from the fibrous components, and optionally separating the polypropylene backing from the face (Continued)

fiber. A clean adhesive/calcium carbonate product can also be produced from this process.

3 Claims, 18 Drawing Sheets

(51) Int. Cl.

| | | |
|---|---|---|
| *B29K 23/00* | (2006.01) | |
| *B29K 55/00* | (2006.01) | |
| *B29K 67/00* | (2006.01) | |
| *B29K 77/00* | (2006.01) | |
| *B29B 17/02* | (2006.01) | |
| *B29B 17/00* | (2006.01) | |
| *B29L 31/00* | (2006.01) | |

(52) U.S. Cl.
CPC .......... *B29B 17/02* (2013.01); *B29B 17/0412* (2013.01); *B29B 2017/0203* (2013.01); *B29B 2017/0217* (2013.01); *B29B 2017/0224* (2013.01); *B29B 2017/0231* (2013.01); *B29B 2017/044* (2013.01); *B29B 2017/0424* (2013.01); *B29B 2017/0468* (2013.01); *B29B 2017/0488* (2013.01); *B29K 2023/12* (2013.01); *B29K 2055/00* (2013.01); *B29K 2067/00* (2013.01); *B29K 2077/00* (2013.01); *B29L 2031/7322* (2013.01); *Y02W 30/52* (2015.05); *Y02W 30/62* (2015.05)

(56) References Cited

U.S. PATENT DOCUMENTS

| | | | |
|---|---|---|---|
| 4,345,039 A | | 8/1982 | Cowan et al. |
| 5,297,384 A | | 3/1994 | David et al. |
| 5,457,197 A | | 10/1995 | Sifniades et al. |
| 5,497,949 A | | 3/1996 | Sharer |
| 5,535,945 A | | 7/1996 | Sferrazza et al. |
| 5,681,952 A | | 10/1997 | Sifniades et al. |
| 5,704,104 A | | 1/1998 | Bacon et al. |
| 5,722,603 A | * | 3/1998 | Costello ............... B03B 5/34 241/20 |
| 5,785,259 A | * | 7/1998 | Nishibori ............... B04C 5/26 241/24.18 |
| 5,840,773 A | | 11/1998 | Booij et al. |
| 5,889,142 A | | 3/1999 | Mohaher et al. |
| 5,898,063 A | | 4/1999 | Stefandl |
| 5,929,234 A | | 7/1999 | Sifniades et al. |
| 6,140,463 A | | 10/2000 | Stefandl |
| 6,398,138 B1 | | 6/2002 | Robinson et al. |
| 6,498,250 B2 | | 12/2002 | Raets et al. |
| 6,752,336 B1 | | 6/2004 | Wingard |
| 7,045,590 B2 | | 5/2006 | Bell |
| 7,067,613 B2 | | 6/2006 | Mauldin et al. |
| 7,550,516 B2 | | 6/2009 | Berard et al. |
| 7,659,320 B2 | | 2/2010 | Berard |
| 7,784,719 B1 | | 8/2010 | Wingard |
| 8,110,131 B1 | * | 2/2012 | Dell'Orco ............... B29B 17/02 264/141 |
| 8,205,814 B2 | | 6/2012 | Lindsey et al. |
| 8,360,348 B2 | | 1/2013 | Levy et al. |
| 8,596,563 B2 | | 12/2013 | Levy et al. |
| 8,864,057 B2 | | 10/2014 | Bork et al. |
| 2008/0064794 A1 | | 3/2008 | Murdock et al. |
| 2008/0213562 A1 | | 12/2008 | Przybylinski et al. |
| 2009/0300982 A1 | | 12/2009 | Mauldin et al. |
| 2010/0330288 A1 | | 12/2010 | Segars et al. |
| 2011/0040027 A1 | | 2/2011 | Keating |
| 2011/0220293 A1 | | 9/2011 | Yu |
| 2012/0241542 A1 | | 9/2012 | Lindsey et al. |
| 2012/0298010 A1 | | 11/2012 | Ginn |
| 2013/0175377 A1 | * | 7/2013 | Levy .................. B02C 19/0056 241/60 |
| 2013/0280976 A1 | | 10/2013 | McCann et al. |
| 2015/0021422 A1 | * | 1/2015 | Hall ........................ B02C 23/08 241/20 |

FOREIGN PATENT DOCUMENTS

| | | | | |
|---|---|---|---|---|
| EP | | 0739657 A1 | * 10/1996 | ............ B29B 17/02 |
| EP | | 2186942 A1 | 5/2010 | |
| JP | | 2003164827 A | 6/2003 | |
| JP | | 2004168023 A | 6/2004 | |
| JP | | 2006116298 A | 5/2006 | |
| WO | | 20002010738 | 3/2000 | |
| WO | | 2010052478 A1 | 5/2010 | |

OTHER PUBLICATIONS

Anonymous, "Separation Process," Research Disclosure No. 38813, p. 474, Aug. 1996.
Y. Wang, "Carpet Recycling Technologies," http://www.prism.gatech.edu/.about.yw6/Fiberrecycling/Recycling%20in%20Te- xtiles%20YWang%20Ch6.pdf.
Y. Wang et al., "Recycling of Carpet and Textile Fibers," Plastics and the Environment: A Handbook; Chapter 16, pp. 697-725, 2003.
Corresponding European Application, 17167388.2, European Search Report dated Sep. 12, 2017, 6 pages.

* cited by examiner

PROCESSES AND STRUCTURES FOR RECYCLING CARPET AND PRODUCTS OF SUCH PROCESSES

CROSS-REFERENCE TO RELATED APPLICATIONS

This application claims priority to U.S. Provisional Application No. 62/325,017, titled "Processes for Recycling Carpet and Products of Such Processes" and filed on Apr. 20, 2016, the entire disclosure of which is hereby incorporated by reference.

TECHNICAL FIELD

The present application relates to methods for recycling a material, and more specifically, to processes of recycling carpet that produce a low ash fiber suitable for industrial use. The application further relates to the production of clean face fiber and clean polypropylene backing fiber suitable for industrial use, and to the face fiber, backing fiber, and other products produced using such processes.

BACKGROUND

Carpet suitable as feedstock for this application is composed of three distinct materials: 1) the face fiber or pile, typically made of a polyamide such as Nylon 6 or Nylon 66, a polyester such as polyethylene terephthalate (PET), or other polyesters such as polytrimethylene terephthalate (PTT), or a polyolefin such as polypropylene or polyethylene; 2) the backing, usually made of polypropylene or less frequently PET or jute or acrylic fiber, or a mixed fiber; and 3) the adhesive, often a blend of an organic component and an optional inorganic component. The organic component is often a styrene butadiene rubber (SBR) or ethylene vinyl acetate (EVA) latex. It can also be a urethane, foamed elastomer, vinyl compound, or a compound containing natural or synthetic rubber. The inorganic filler is often calcium carbonate or limestone mixed into the adhesive to provide weight to the final carpet.

Thousands of tons of post-consumer and post-industrial carpet are sent to landfills each year. These carpets are difficult to recycle, being mixtures of various plastics, binders, inorganic fillers, and fibers. Many high-end uses of recycled carpet require separating the different polymers, removing dirt and other contaminants, and removing the binders and other fillers. By design, carpeting is difficult to deconstruct. It is built to survive decades of wear without having the face fiber pull free from the backing material, and without the adhesive failing.

The most valuable portion of the carpet is often the "face fiber" material, also sometimes described as "pile," which typically makes up from about 35 to about 65 wt. % of the carpet. Carpet to be recycled is often sorted based on its face fiber composition, with nylon carpet currently being more valuable due to the higher demand for recycled nylon. This sorting step allows the recovery of an essentially single-component face fiber stream.

One conventional method for recovering the face fiber material typically involves shearing, a method for removing face fiber material analogous to shearing a sheep to remove its fleece. In such methods, the balance referred to as the carcass is typically discarded. An advantage of this method is that most of the non-face fiber portion of the carpet is separated from the face fiber. A disadvantage of the method is that shearing is labor intensive. Pieces of carpet must be unrolled, cut into appropriately-sized pieces, and manually fed one-by-one into a shearing unit. The carpet must be fed into the shearer in the proper orientation, with the face fiber oriented toward the shearing blades, making the sheared fiber susceptible to contamination with the backing material. A further disadvantage of this method is that the yield of face fiber is low—typically only 25% to 50% of the face fiber is recovered.

In shearing, the cutting depth must be carefully adjusted to maximize face fiber recovery while minimizing cutting into the backing material. Unfortunately, carpet thicknesses vary. Deep cuts risk contaminating the sheared fiber, while shallow cuts result in yield losses. Cutter wear in such applications is significant and costly.

Another conventional method of carpet recycling is whole carpet shredding. The entire carpet is simply shredded into fibers, and a portion of the latex and inorganic filler are removed as sand or dust. However, this method has the disadvantage of leaving the backing polypropylene fibers still intermixed with the face fibers. Furthermore, the bottom end of each face fiber retains a significant portion of the latex and inorganic filler, making this face fiber unsuitable for uses that require a more purified recycled face fiber.

U.S. Pat. No. 5,889,142 discloses a process for selectively separating polyamides from multi-component waste materials that includes the steps of subjecting the multi-component mix to a specific mixture of caprolactam and water at a preselected temperature range below the degradation temperature of the polymer to be recovered, separating the formed polyamide solution, and recovering the desired polyamide.

U.S. Pat. No. 7,067,613 discloses, in the recycling of Nylon 6 and Nylon 6,6 polyamides from post-consumer or post-industrial waste, a process to separate the polyamides from commingled polyolefin waste components, particularly polypropylene, by admixing the waste with an ester solvent composition and heating the admixture to a temperature above the melting temperature of the contained polyolefins to form an ester solvent composition further containing dissolved polyamide polymer and a separate immiscible liquid polyolefin phase.

U.S. Pat. No. 6,752,336 discloses a method of recovering carpet materials by reducing carpet into size-reduced fibers, slurrying the size-reduced fibers in a liquid medium, and then selectively separating the size-reduced fibers in a centrifuge. The method is said to be particularly appropriate for recovering nylon or polyester face fibers from post-industrial, pre-consumer carpet waste.

U.S. Pat. No. 6,498,250 discloses a process for nylon depolymerization in which a multi-component material, comprising nylon and one or more non-nylon components, is fed to a depolymerization zone in which depolymerization of at least part of the nylon is effected, resulting in a product stream and a residue, the product stream containing monomers of the nylon, and the residue containing non-nylon components, in which the nylon content in the residue is measured and used to control the depolymerization process.

U.S. Pat. No. 7,784,719 discloses methods of recovering primary construction materials from whole carpet that are said to be particularly appropriate for recovering nylon or polyester face fibers from post-industrial, post-consumer carpet waste. The methods include reducing the whole carpet into fragmented carpet materials (i.e., pile, backing, and binder), further reducing the fragmented carpet materials into size-reduced fibers and binder, slurrying the size-reduced fibers and binder in an aqueous liquid medium (e.g., water), and then separating the size-reduced fibers and binder in a centrifuge.

U.S. Pat. Publn. No. 2011/0040027 discloses a method of recycling carpet components that comprises converting post-consumer carpet that includes a latex backing into a free-flowing powder that is said to be suitable for incorporation into one or more products as a recycled product component. Various processes of converting post-consumer carpet comprising a latex backing are disclosed, including a process in which a portion of face fibers may be harvested from used, post-consumer carpet, or the carpet may simply be shredded to form a first mixture, after which a portion of carpet fibers are separated from and removed from the first mixture to form a second mixture, which may subsequently be exposed to a relatively high level of heat to thermally degrade and/or partially volatilize polymeric material present in the second mixture. This mixture may then be incorporated into new products, either alone or admixed with a solid inorganic particulate material.

U.S. Pat. No. 8,864,057 discloses methods of recovering face fiber from whole carpet by heating the whole carpet to a temperature sufficiently high and a time sufficiently long to thermally decompose at least a portion of the backing material, rendering the backing material friable and to then apply mechanical force to the carpet so as to liberate the face fiber material from the friable backing material. According to the application, the backing material, which is typically a woven material, comprises a material that may be thermally decomposed, pyrolyzed, or oxidized, for example a polyolefin such as polyethylene or polypropylene. The backing material may further comprise additional materials such as adhesives and inorganic fillers, which together form a friable backing material or a backing residue when the carpet is heated. While this process is useful for the recovery of face fiber, it does not allow for the recovery of a useful polypropylene stream, since the polypropylene is included in the friable backing material and has been degraded to form a friable material.

Notwithstanding the carpet recycling methods just described, there remains a need in the art for improved processes for recycling carpet, especially those containing face fibers such as nylons and polyesters.

SUMMARY

In one aspect, the application relates to processes for recovering face fiber material and polypropylene from a carpet that includes a polyamide, polyester, or polyolefin face fiber, a polypropylene backing material, and an adhesive material comprising an organic component and an optional inorganic filler. Typically, the inorganic filler is dispersed into the organic component. This adhesive material is used to secure the face fiber to the polypropylene backing.

Carpet to be recycled is often sorted by face fiber type before processing to allow the recovery of a relatively pure stream of a single polymeric component. Alternatively, for the production of a mixed low-ash fiber product, no sortation is required.

The process includes the first step of mechanically disassembling the carpet to break the bond between the adhesive material and the fibrous materials (face fiber and backing material), allowing the backing and face fiber to disengage from each other. It can be useful to maintain the face fiber in the form of a tuft or a twisted pile in this step. The backing material separates into a mass of thread-like fibers. The second step involves mechanically impacting and screening the face fiber tufts and the backing fibers to liberate any residual attached adhesive granules from the fibers, and to separate these adhesive granules from the fibers.

If the feedstock to this process comprises polyester face fiber with polypropylene backing, then the product will be a low ash mixed fiber containing both polyester and polypropylene fibers. If the feedstock to this process comprises a polyamide face fiber with polypropylene backing, then the product will be a low ash mixed fiber containing both polyamide and polypropylene fibers.

If the feedstock to this process comprises a variety of face fibers and polypropylene backing, then the product will be a low ash mixed fiber containing the mixed face fibers and the fibers derived from the polypropylene backing.

Such mixed fiber products are especially useful in the production of non-woven textiles, such as carpet underlayment, sound proofing materials, and thermal insulating materials.

If the feedstock to this process comprises polypropylene face fiber with polypropylene backing, then the product will be a low ash polypropylene fiber. This fiber can be used in the production of non-wovens, can be agglomerated or densified to form granules, or can be extruded or compressed to form pellets for subsequent industrial use.

Depending on the type of face fiber and the end-use of the products, it may be useful to also include the step of mechanically separating the face fiber tufts from the backing using a screener-type device. Such a device will retain the longer polypropylene fibers while allowing the face fibers (in the form of a tuft or twisted pile) to pass through the screen. This will create two useful product streams: face fiber and polypropylene. This additional step can be especially useful if the face fiber is a polyamide or a polyester. The separation of face fiber from backing fiber must occur after the mechanical disassembly of the feedstock carpet, and can occur either before or after the separation of the adhesive granules from the fiber product.

In another aspect, the application relates to the fiber materials obtained from these processes, which are largely free of adhesive and inorganic filler.

Further aspects of the application are as disclosed and claimed herein.

DETAILED DESCRIPTION

Figure 1:
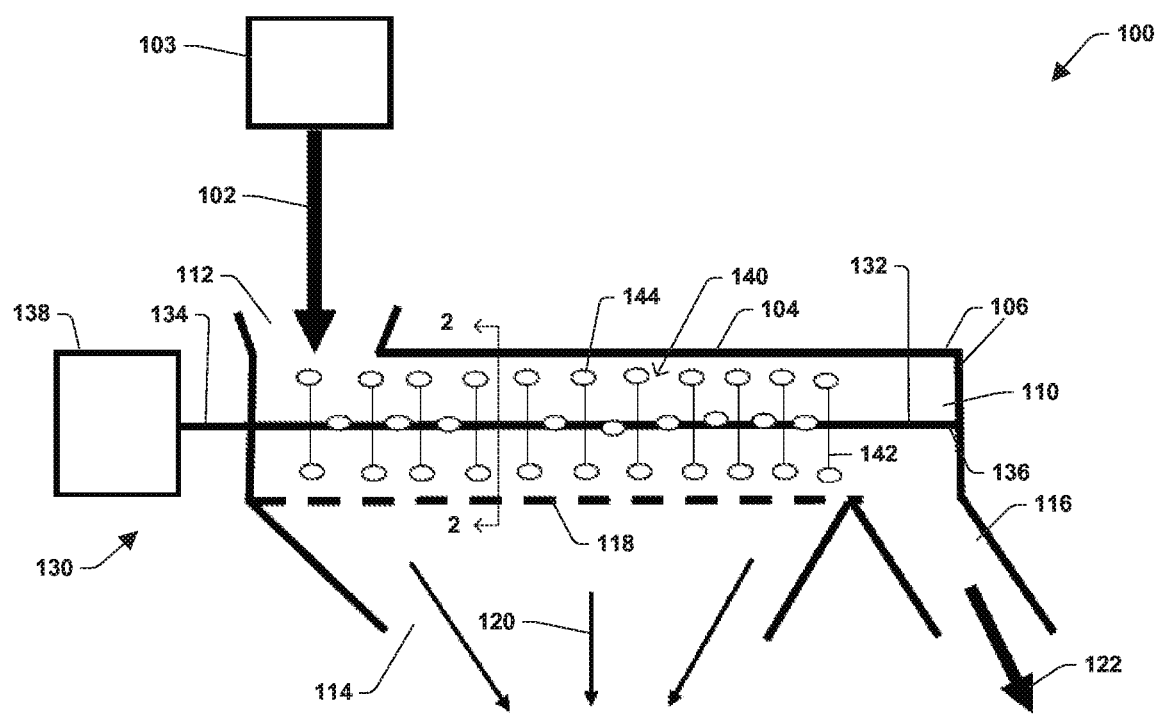
FIG. 1 is an illustration of an example rotary impact separator.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

In typical carpet manufacture, lengths of face fiber are sewn into a polypropylene backing (i.e. the "primary backing") in a process called tufting. The twisted threads that form the upper surface of a carpet are referred to as "twisted piles" or "tufts". However, the mechanical connection between the polypropylene backing and the face fiber is weak, and would not provide a long-lasting floor covering. To remedy this, carpet manufacturers apply a layer of adhesive to bond the face fibers to the backing. A second layer of polypropylene backing (i.e. the "secondary backing") is often attached using the adhesive layer to provide additional strength. In this patent we refer to both the primary and secondary polypropylene backing layers as the "backing".

The adhesive used in carpet manufacture often includes a latex, often either SBR (styrene butadiene rubber) or EVA (ethylene vinyl acetate) emulsified in water. Optionally, to provide more weight to the carpet and a more flat floor covering, this latex can be weighted with an inorganic filler such as calcium carbonate or limestone before it is applied to the carpet. The net effect is a durable floor covering that lasts a long time. Alternate adhesive systems comprising polyurethane, various natural and synthetic rubbers, foamed elastomers, blends of the forgoing, and the like can also be used as the adhesive component, and are suitable feedstocks for this application.

In some carpet constructions, the backing layer or layers can also contain threads of different substances including polyesters and natural fibers. In some cases, the backing comprises polypropylene threads running in one direction, with polyester threads running at right angles to the polypropylene threads. All of these backing compositions are suitable feedstock for this process.

The calcium carbonate or limestone often added to the adhesive is an inorganic component. In a typical ashing protocol, such as ASTM D 56530, the calcium carbonate or limestone will report to the "ash" stream. Ash levels in carpet can be 20% to 50% by weight or more. This high level of ash, along with the associated latex, makes recycled carpet a poor feedstock for most industrial processes. It is critical to remove most of this ash and latex to create a valuable recycled product stream.

To recycle carpet and create a low ash fiber product then, one must overcome this attachment between the fibrous components and the adhesive, and then efficiently separate the adhesive granules from the fibrous components. Without sufficient separation, it is difficult or impossible to re-use the polymeric components (polyamides, polyesters, polypropylene) in the manufacture of other fibers and articles.

In this application, the separation of the components in the carpet is accomplished though the following steps:

1) Applying sufficient mechanical force to the carpet to disassemble the feedstock carpet, breaking the bond between the adhesive and the fiber without substantially opening the carpet face fiber tufts. This results in relatively long polypropylene threads from the backing and relatively small tufts of face fiber.

2) Separating the loose granules of adhesive from the fiber using a centrifugal screening device.

Optionally, it may be desirable to mechanically separate the face fiber tufts from the backing materials. This optional step can occur before or after Step 2.

Thus, in one aspect, the application relates to a first step that includes the mechanical disassembly of the carpet by mechanically breaking the bond between the adhesive and the fiber. This is accomplished by using a device that would apply impact to the carpet, fracturing the bond between the adhesive and the fibers. One such device would be a hammer mill, such as those manufactured by Schutte Buffalo. In this device, swinging hammers on a central rotating shaft repeatedly strike pieces of carpet until they are small enough to pass through a screen. These repeated strikes mechanically break the bond between the adhesive and the fiber.

The feed to the hammer mill must be pieces of appropriate size relative to the size of the holes in the screen. If the pieces are too large, the residence time in the mill is too long, and the carpet may overheat. In extreme cases, this heat can cause even the backing or face fiber to melt. If the pieces are too small, the residence time in the mill is too short, and there is insufficient impact to break the bond between the adhesive material and the fibrous material. Proper sizing can be determined by testing. Screen holes sizes between about 0.5 and 3 inches (approximately 12 to 75 mm) are useful.

This portion of the process can include a single device, multiple devices in sequence, or multiple passes through a single device or train of devices.

After the impact device breaks the bond between the adhesive and fibrous materials, the adhesive granules must be separated from the fibrous material in Step 2. Since the adhesive (along with the optional inorganic filler material) is in granular form at this point in the process, it can be removed by various types of centrifugal screening devices, such as those manufactured by Sweco or Scotts, or Kason. A centrifugal screener uses centrifugal force to repeatedly throw the screener feedstock against the screen. This added force aids in the disengagement of the liberated adhesive granules (created in Step 1) from the fiber.

A conventional vibratory screener or oscillating sifter, on the other hand, relies mostly on gravity to move the finer particles through the screen. They lack the added centrifugal force supplied by the moving elements in a centrifugal screener.

With a centrifugal screener, using a screen with openings of approximately 3 to 12 mm, the fibrous components are retained on the surface of the screen while the bulk of the granular adhesive and inorganic filler pass through the screen to the collection device below.

Larger screen opening will lead to more removal of the adhesive granules, but lower yields of fiber. Smaller screen openings will improve fiber yield, but will retain some of the larger adhesive granules.

One or more screening devices can be used in sequence to achieve the proper degree of separation. These can be the same type of device or different devices. The screen sizes can be the same or different. Optionally, the material passing through a first screening device can be re-processed through a different separation device to recover lost fiber, thereby improving yield of fiber.

A secondary screening device, with screen holes smaller than those in the centrifugal screener, can be used to recover smaller fibers inadvertently lost with the adhesive granules that passed through the holes of the centrifugal screener.

Alternatively, aspiration devices such as those manufactured by Kice or Forsbergs can be used to separate some of the adhesive granules from the fibrous material using vacuum, pressure, and directed streams of air. These can be used before or after the centrifugal screener, as well as on the granule-rich product stream emanating from the centrifugal screener.

One or more of the above separation devices can be used in series. These devices can be the same type of devices or different devices.

Some impact devices offer the ability to simultaneously break the bond between the adhesive and the fibrous material, and separate some of the adhesive granules from the fiber. One type of equipment that can achieve this simultaneous mechanical disassembly and adhesive granule separation are fiber cleaning equipment like those offered by Laroche in France or Trutzler in Germany. In this equipment, carpet pieces are impacted by pins on a rapidly rotating steel roller, breaking the bond between the adhesive and the fibrous components. Simultaneously, air streams and inertia separate some of the granular material from the fibrous material. This accomplishes the first step of the process along with some reduction in adhesive content. Additional adhesive granule separation is then accomplished using a centrifugal screen device.

It is possible to achieve sufficient mechanical disassembly and some adhesive granule separation in a single unit of this type, or one may choose to use a series of these devices to improve yield and quality. Such devices can optionally employ either internal or external recycle of fiber to maximize fiber recover.

Another type of machine that can simultaneously break the bond between the adhesive and the fibrous material, and separate some of the adhesive granules from the fiber is a Rotary Impact Separator, as shown in FIG. 1. In this unit, rapidly rotating elements attached to a central shaft impact the feed carpet, breaking the bonds between the adhesive and the fibers, and separating the face fiber tufts from the backing. The rotating elements can have the appearance of paddles, chains, knives, or other shapes. Some rapidly rotating elements near the feed end of the unit impact the feedstock carpet causing disassembly. Other rotating elements, near the middle of the unit impact the liberated tufts and fibers, shattering the attached adhesive into small granules. Yet other elements near the exit end of the unit aid in the separation of the loose granules from the fibrous components. The granular adhesive is thrown through screens on the bottom and/or sides of the unit by centrifugal force, while the reduced ash fibrous product is conveyed out the exit chute. Various dams, baffles, breakers, and adjustable gates can also be used to help control flow and residence time of the fiber within the unit, optimizing both throughput and adhesive granule removal.

Referring to FIG. 1, a rotary impact separator 100 (hereinafter "separator") is illustrated. The separator 100 can be used to separate a material. For example, the separator 100 can break a bond between an adhesive and a fibrous material, separate adhesive granules from the fibrous material, separate different types of fibrous materials, etc. It will be appreciated that the separator 100 illustrated in FIG. 1 is merely exemplary and comprises only one of a number of different embodiments. In other examples, the separator 100 may have different sizes, shapes, constructions, configurations, etc.

In the illustrated example, the separator 100 may receive material 102 from a source 103. The material 102 may comprise, for example, recycled carpet, nylon, polyethylene terephthalate (PET), polypropylene (PP), a turf material, and/or mixtures thereof. The material 102 can be supplied from a source 103 to the separator 100.

The separator 100 comprises a body 104. The body 104 extends along a body axis and includes one or more walls 106. The walls 106 can be hard faced to limit premature wear for applications that involve abrasive materials. The body 104 can have any number of shapes, such as cylindrical shapes, cubic shapes, or the like. In an example, the body 104 may be substantially hollow, such that the wall 106 can define a chamber 110. The chamber 110 is sized to receive the material 102 from the source 103. In an example, the body 104 can extend substantially parallel to a floor, though, in other examples, may extend substantially perpendicular to the floor. The body 104 may have a length to diameter ratio of at least 1 to 1, and, in some examples, 4 to 1, and, in other examples, 6 to 1 or more. The cross-section of the chamber 110 can be square, rectangular, rounded, combinations thereof, etc. In some examples, the body 104 may have a rectangularly shaped upper section and a semi-circular shaped lower section.

The body 104 can define one or more openings through which the material 102 can enter the chamber 110. For example, the body 104 may have an inlet opening 112. The inlet opening 112 can be positioned in proximity to the source 103. As such, the material 102 can be provided from the source 103 to the chamber 110 through the inlet opening 112. In the illustrated example, the inlet opening 112 is located substantially underneath the source 103, such that the material 102 can fall (e.g., due to the effects of gravity) from the source 103 and through the inlet opening 112. In other examples, the source 103 could be positioned at other locations with respect to the body 104, such as along a side of the body 104, etc. The inlet opening 112 can also receive material pneumatically or from a metering device. While the inlet opening is illustrated as being located at an end of the body 104 adjacent to a motor 138, such a location is not intended to be limiting.

The body 104 can define two or more outlet openings. For example, the body 104 may have a first outlet 114 and a second outlet 116. In the illustrated example, the first outlet 114 and/or the second outlet 116 can be located on an opposing circumferential side from the inlet opening 112 and/or the source 103. For example, the inlet opening 112 and/or the source 103 may be positioned along a top of the body 104 (e.g., at a first location) while the first outlet 114 and/or the second outlet 116 may be positioned along a bottom of the body 104 (e.g., at a second location that is about 180 degrees from the first location).

In an example, co-products 120, 122 of the material 102 can exit the chamber 110 by passing through the first outlet 114 and/or the second outlet 116. In an example, the first outlet 114 and the second outlet 116 may be located at different axial locations along the length of the body 104. For example, the first outlet 114 may be located towards a center of the body 104 and/or in closer proximity to the inlet opening 112 than the second outlet 116. The second outlet 116 may be located towards an end of the body 104 at an opposite end of the body 104 from the inlet opening 112. In this example, the first outlet 114 and the second outlet 116 may be located at an under side of the body 104 opposite from the inlet opening 112 (e.g., which may be located at a top side of the body 104).

In an example, the first outlet 114 and the second outlet 116 can have different sizes. For example, the first outlet 114 can have a larger size (e.g., length, width, etc.) than the second outlet 116. Such a size difference may be provided to accommodate for a difference in amount of material 102 that passes through the first outlet 114 and the second outlet 116.

Focusing upon the first outlet 114, a screen 118 may be disposed within the first outlet 114 and/or covering the first outlet 114. In such an example, the screen 118 can selectively filter a first co-product 120 of the material 102. The screen 118 can be attached to one or more walls 106 of the body 104 adjacent to the first outlet 114. As such, the first co-product 120 can pass through the screen 118 while passing from the chamber 110 and through the first outlet 114. The screen 118 may have one or more holes that define openings through which the first co-product 120 can pass through. The screen 118 can therefore function to filter at least some of the first co-product 120 from the material 102. To increase screening area, it is possible to fit either of the long walls 106 or the top of the unit with screening means. Such an arrangement can be useful if long axis of the unit is located perpendicular to the building floor.

In an example, the screen 118 may comprise a floor of the body 104, such as a floor with one or more holes to allow for small particles to exit. In such an example, the wall or floor may comprise a perforated material or screening means to allow for the small particles to exit. These small particles may exit by a combination of gravitational forces and centrifugal forces. The size, shape, and arrangement of the openings may depend on a particular application. For example, in the removal of fine granules from fiber, the screen 118 may comprise a punched plate with very fine holes to allow for the removal of the fine granules with a minimal loss of fiber. In another example, for the separation of carpet tufts from long polypropylene threads, a larger sized screen opening may optimally be employed with openings sufficiently large to pass the tufts. The screen 118 can be a perforated plate, a woven screen, a slotted screen, or a combination of the above. In an example, a smooth punched plate may allow for faster axial passage of the material 102 through the chamber 104, and increase throughput, while a woven screen may tend to retard flow, decrease throughput, but can also result in more impacts and/or a cleaner separation. In some examples, it may be beneficial to vary the screen 118 type, or the hole size from the inlet to the exit of the chamber 104. Using screens of varying hole sizes can allow for the generation of more than two product streams from a single unit.

In some examples, the screen 118 can be easily removable to allow for facile cleaning and facile servicing of the chamber 104. Finer screens 118 may tend to be thinner than coarser screens 118, since one typically does not want the thickness of the screens 118 to be greater than the diameter hole. Thinner screens 118 may lack mechanical strength, especially when resisting the impact of centrifugally accelerated particles. Consequently, for finer screens 118, it may be useful to use a coarser screening means as a backing to provide mechanical support for the thinner finer screens 118.

It will be appreciated that the screen 118 is not limited to being located within the first outlet 114. Rather, in some examples, the screen 118 can also cover the second outlet 116. As such, the screen 118 can cover both the first outlet 114 and the second outlet 116. In another example, a first screen (e.g., screen 118) can cover the first outlet 114 while a second, different screen can cover the second outlet 116.

The second outlet 116 may be located on the top, side, or bottom of chamber 110. The second co-product 122 of the material 102 can pass through this outlet by gravity, by centrifugal force, or by pneumatic force. The choice of location depends on the material being separated and the location of the inlet of the next unit downstream of the rotary impact separator 100. In a possible example, the second outlet 116 may be formed within an end wall of the body 104, such that the second co-product 122 can exit through the second outlet 116 and through the end wall of the body 104 in a direction that is substantially parallel to the shaft 132.

The second outlet 116 may or may not be covered with a screen. In an example, a second co-product 122 of the material 102 can pass from the chamber 110 and through the second outlet 116. The second co-product 102 may include portions of the material 102 that are not contained as part of the first co-product 120. In some examples, due to the presence of the screen 118 in the first outlet 114, the first co-product 120 may comprise a more fine material than the second co-product 122. As such, the second co-product 122 may comprise a coarser product than the first co-product 120. In these examples, portions of the material 102 that do not pass through the first outlet 114 as part of the first co-product 120 may pass through the second outlet 116 as part of the second co-product 122.

The rotary impact separator 100 may comprise an impact device 130 for separating the material 102 into the first co-product 120 and the second co-product 122. The impact device 130 may be positioned at least partially within the chamber 110 of the body 104. As such, the impact device 130 can contact, impact, etc. the material 102 when the material 102 is located within the chamber 110.

The impact device 130 comprises a shaft 132. The shaft 132 can extend between a first end 134 and a second end 136. The first end 134 of the shaft 132 may be positioned at an exterior side of the body 104. The second end 136 may be positioned at an interior of the body 104 within the chamber 110. The shaft 132 can extend substantially linearly between the first end 134 and the second end 136. In an example, the shaft 132 can be formed of a substantially rigid and/or non-flexible material that is limited from inadvertent bending, flexing, fracture, etc. The shaft 132 may comprise any number of materials, including metal materials, non-metal materials, plastic materials, composites, etc.

The first end 134 of the shaft 132 may be coupled to a device that can impart movement to the shaft 132. In an example, the first end 134 may be coupled to a motor 138. It will be appreciated that the motor 138 may include any number of movement imparting structures. For example, the motor 138 may comprise gears, drives, sheaves, belts, DC motors, AC motors, asynchronous motors, synchronous motors, etc. In these examples, the motor 138 can cause the shaft 132 to rotate. A user can set and/or adjust the motor 138 to control movement of the shaft 132. For example, the user can set and/or adjust the motor 138 output speed so as to control the rotational speed of the shaft 132.

The impact device 130 may comprise one or more effect structures 140 coupled to the shaft 132. In an example, the effect structures 140 are provided to contact the material 102 within the chamber 110. By contacting the material 102, the effect structures 140 can more effectively disassemble the material 102 and separate the material 102 into the first co-product 120 and the second co-product 122. In addition, since the effect structures 140 are coupled to the shaft 132, the effect structures 140 can be rotated due to the rotation of the shaft 132.

The effect structures 140 may comprise an attachment shaft 142 and an end effect 144. The attachment shaft 142 may be coupled to the shaft 132. In some examples, the attachment shaft 142 may be substantially perpendicular with respect to the shaft 132. In other examples, the attachment shaft 142 may be angled with respect to the shaft 132, such as by forming an angle that is between about 10 degrees to about 80 degrees with respect to the shaft 132. The attachment shaft 142 can be formed of a substantially rigid and/or non-flexible material that is limited from inadvertent bending, flexing, fracture, etc. The attachment shaft 142 may comprise any number of materials, including metal materials, non-metal materials, plastic materials, composites, etc. The attachment shaft 142 can extend a distance from the shaft 132 towards the walls 106 of the body 104.

One or more end effects 144 can be coupled to the attachment shaft 142. In an example, the end effects 144 can be coupled to an end of the attachment shaft 142 that is opposite the shaft 132. The end effects 144 may be provided so as to contact the material 102 when the shaft 132 is rotated. The contact of the material 102 by the end effects 144 can cause the material 102 to separate into the first co-product 120, the second co-product 122, etc. For example, the end effects 144 may be rotated as a result of the rotation of the shaft 132 and resulting rotation of the attachment shaft 142. This movement of the end effects 144 can cause contact between the material 102 and the end effects 144. To improve balance, end effects 144 may be installed in pairs, one on each side of the shaft 132. The end effects 144 in a pair can be the same or nearly the same weight.

A flow of the material 102 through the chamber 110 may be controlled by a combination of gravity and angled end effects 144 such as paddles. In the absence of any angled end effects 144, flow through the chamber 110 can be achieved by angling the chamber 110 relative to the floor so that the inlet end is higher than the exit end. Thus with each turn of the shaft 132, the fluffed material 102 may fall slightly downfield from its previous position. Angled end effects 144 such as paddles and claws move material downfield through a combination of direct action on the feed material and by creating an axial air movement that helps to lift and carry finer particles and fibers downfield. Depending on the rotational speed and the desired residence time, a combination of tilting and paddles can be used to move material through the chamber 110.

Alternatively, one can use slightly opposing forces to retard excessively fast axial movement. For example, one could set paddles to push material downfield, and then elevate the exit end of the chamber 110 to slightly retard that motion. Changing the angle of the chamber 110 can provide an easy means of on-line control of the residence time.

FIGS. 2A to 2D illustrate examples of the rotary impact separator 100 as viewed from the perspective indicated by lines 2-2 in FIG. 1. As illustrated, other example methods of controlling flow through the chamber 110 may include the use of static or mobile baffles 202. In an example, one or more baffles 202 may be inserted at right angles to the long dimension of the chamber 110 and at right angles to the shaft 132. These baffles can be inserted from the "floor", "ceiling" or "side walls" of the chamber 110 to various depths. The more intrusive the baffle, the more it will retard motion through the chamber 110, and the more it will increase residence time. Baffles can be used singly or in pairs. For example, one might have one baffle extending down from the "ceiling" and another extending upward from the "floor" with a small opening in between the two baffles to allow flow. In the limiting case, one can divide a long chamber 110 into a series of smaller sub-chambers, each with its own screen 118 and end effects 144. For the processing of carpet, it is useful to have a number of baffles to help promote plug flow and prevent by-passing of the rotating implements by the carpet pieces.

The speed of revolution of the shaft 132 is another controllable and beneficial parameter. Higher rotational rates increase the speed of the end effect 144, and increase the amount of energy transferred to the feedstock. For some applications, such as adhesive removal, a high rate of speed may be provided to break the bonds between the adhesive and the substrate. For other applications, such as sorting and screening, a lower rotational rate is optimum to allow time for smaller particles to pass through the screen 118 before getting hit by the next paddle. In general, the separator 100 is operated at end effect tip speeds that are higher than those normally found in a centrifugal sifter, but lower than those found in a hammer mill. It can be useful to have several separator 100 units in series, each operating at a different rotational rate to achieve different goals, for example: initial disassembly, adhesive/substrate bond breaking, granule removal from fiber.

Figure 2A:
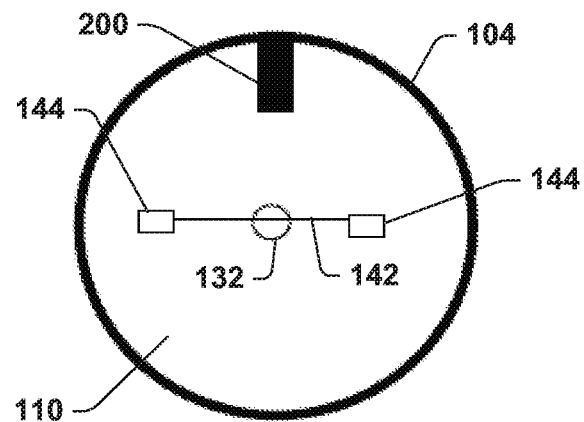
FIG. 2A is an illustration of a portion of an example rotary impact separator.
Figure 2B:
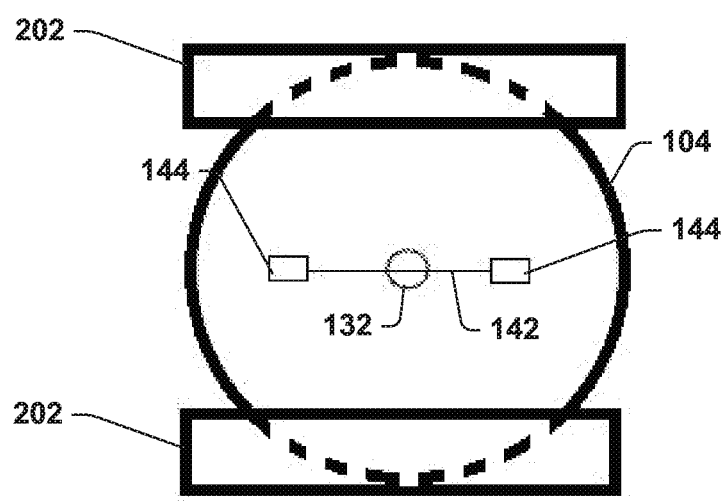
FIG. 2B is an illustration of a portion of an example rotary impact separator.
Figure 2C:
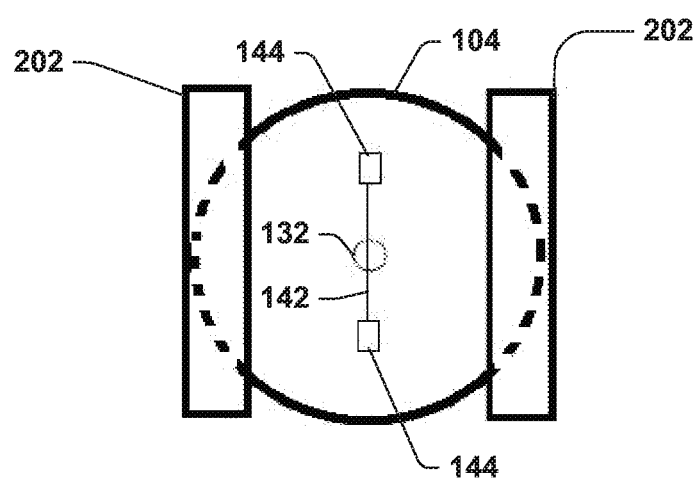
FIG. 2C is an illustration of a portion of an example rotary impact separator.
Figure 2D:
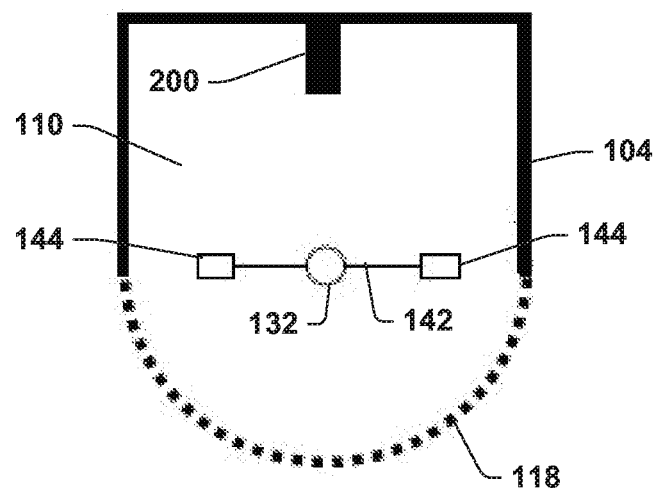
FIG. 2D is an illustration of a portion of an example rotary impact separator.

To limit feedstock materials 102 from simply rotating with the end effects 144 on the shaft 132, breakers 200 (e.g., as illustrated in FIGS. 2A and 2D) or other disruption points can be added. In an example, the breakers 200 may be attached to the body 104 (e.g., to an interior surface of the wall 106). The breakers 200 can project from the body 104 towards the shaft 132 so as to define a reduced diameter within the chamber 110.

The breakers 200 may be attached to the long walls or "ceiling" of the chamber 110 and typically run parallel to the long dimension of the chamber 110, and parallel to the shaft 132. They protrude from the wall or ceiling to disrupt cyclonic flow of material around the central shaft, causing more interaction with the feedstock material and the end effects 144. The breaker 200 can be a single bar or a series of parallel bars. In some cases, the breakers 200 may comprise a piece of screening material attached to the wall, or one or more lines of raised welding on the inner wall. The breakers 200 can be static or adjustable. The breakers 200 will usually be the point of least gap between a stationary point and the end of an end effect. In a possible example, the breakers 200 may be attached to the screen 118. In some examples, differently sized and/or shaped breakers 200 may be provided in different sections of the chamber 110.

The breakers 200 can also be one or more rods or metal strips attached to the long wall and inserted a short distance radially into the lumen of the processing chamber. In this case, if the breakers 200 are located axially in between the end effects, they can actually extend into the chamber so that the end of the breaker 200 is actually closer to the central shaft 132 than the tip of the end effect 144. Such an arrangement can cause severe turbulence in the flow pattern, and helps strip contaminants from a substrate.

The inlet opening 112 may be internally baffled to prevent premature ejection of the incoming feedstock. This can take the form of a "zig zag" structure or simply an angled chute with internal baffling.

It will be appreciated that the screen 118 illustrated in FIG. 2D has a rounded, non-planar shape. Indeed, in some examples, the screen 118 may have a flat, substantially planar shape while in other examples (e.g., FIG. 2D), the screen 118 may have a rounded, semicircular shape. In either of these examples, the screen 118 can function to limit the type and/or amount of material that passes through perforations in the screen 118.

The outlet (e.g., the second outlet 116) can be large enough to accommodate the volume of material produced. In the case of recycled carpet, the bulk density of the product stream is significantly lower than that of the feedstock stream, since the carpet has been disassembled into loose tufts and threads. If the inlet opening 112 is too small, it will create a pinch point and cause the feedstock material to back up in the unit, rather than flow freely. It can be useful to mount a pair of paddles attached to the central shaft in the area of the exit chute to assist in moving the product material out of the chute. The outlet may be located at a variety of places near the end of the separator opposite the feed end, including the "floor", "ceiling", and "sides".

For the recycling of carpet in the separator 100, then, rapidly rotating elements attached to the shaft 132 impact the feed carpet, breaking the bonds between the adhesive and the fibers, and separating the face fiber tufts from the backing. The rotating elements can have the appearance of paddles, chains, knives, or other shapes. Some rapidly rotating elements near the feed end of the unit impact the feedstock carpet causing disassembly. Other rotating elements, near the middle of the unit impact the liberated tufts and fibers, shattering the attached adhesive into small granules. Yet other elements near the exit end of the unit aid in the separation of the loose granules from the fibrous components. The granular adhesive is thrown through screens on the bottom of the unit by centrifugal force, while the reduced ash fibrous product is conveyed out the exit chute. Various dams, baffles, and adjustable gates can also be used to help control flow and residence time of the fiber within the unit, optimizing both throughput and adhesive granule removal.

By optimizing the rotational speed of the unit, the type and location of rotating elements, the distance between the breakers and the rotating elements in the separator 100, and the position of the baffles and dams, one can maximize the removal of adhesive and ash while minimizing fiber breakage and fiber shortening. Especially for product fiber destined for the non-woven industry, fiber length is critical, and long fibers are highly preferred over short fibers.

A Rotary Impact Separator is different from a traditional hammer mill in a number of ways. First, a hammer mill has only one inlet and one outlet for solids. All of the feed material to a hammer mill must be sufficiently reduced in size to pass through the screen in the hammer mill and report to the product stream. In contrast, the Rotary Impact Separator has one inlet and two or more outlet means (the exit chute 116 and through the screen(s) 118). All of the feed to the Rotary Impact Separator does not have to be reduced in size to pass through the screening means. Rather, finer particles can pass through the screen while larger particles can move axially along the screen and exit the device through the alternate exit port.

Secondly, a Rotary Impact Separator uses a variety of elements as the impact means, whereas the hammer mill uses either rigid or hinged solid hammers. The elements or end effects in a rotary impact separator can include variously shaped paddles, claws, knives, chains, hammers, and flails. Each of these end effects is best for a particular function.

Thirdly, the hammer mill spins much faster and provides much more impact energy to feed particles than the rotary impact separator. This can tend to cut or tear fibers as well as open tufts. The more gentle impact of the Rotary Impact Separator, coupled with appropriate end effects, achieves the necessary carpet disassembly without substantially shortening the fiber length. A Rotary Impact Separator operates at tip speeds significantly lower than traditional hammer mills. Hammer mills such as those sold by Schutte Buffalo typically have tip speeds in the range of up to 400 feet per second (approximately 120 meters per second), whereas the Rotary Impact Separator typically has tip speeds in the range of up to 120 feet per second (approximately 35 meters per second). Since energy transferred from the mill to the substrate is a function of the square of the tip speed, the difference is even more dramatic. Excessive energy input, such as that found in a hammer mill, can result in unwanted fiber shortening.

In a hammer mill, the bulk flow of material is largely perpendicular to the rotating axis, whereas in the rotary impact separator, the bulk flow of material is largely parallel to the rotating axis. In a hammer mill, since the bulk flow is largely perpendicular to the rotating axis, an incoming particle of feed effectively interacts with essentially 1 pair of hammers as it falls from the feed chute to the screen. In the rotary impact separator, since the bulk flow of material is parallel to the rotating axis, an incoming particle of feed is forced to interact with substantially all of the end effects as the particle moves from the inlet end to the outlet end of the processing chamber. Furthermore, in a hammer mill, a feed particle can only interact with a single type of end effect (i.e. the hammer), whereas in a rotary impact separator, a feed particle can interact sequentially with a broad range of end effects (paddles, claws, knives, flails, hammers, etc.). The screen 118 in a hammer mill may contain a single size opening and produce a single product. However, in the rotary impact separator, one can use a sequence of screens of varying sizes and produce two or more co-products from a single unit.

A Rotary Impact Separator is also different from a conventional centrifugal screener. A centrifugal screener operates at relatively low rpm compared to a Rotary Impact Separator. At these low tip speeds, the centrifugal screener lacks the energy to disassemble feed carpet pieces or to break the bond between the adhesive and the fiber. The only function of a centrifugal screener is to separate previously-created loose adhesive granules from the fiber. In contrast, the Rotary Impact Separator, by virtue of its unique set of rotating implements and its higher rotational speed, can simultaneously disassemble feed carpet, break the bonds between the fiber and the adhesive, create a granular adhesive material, and separate that granular adhesive material from the fiber.

A centrifugal screener is often used in processes where most of the feed material goes through the screen. This type of operation is often referred to as "scalping"—the removal of a small amount of larger-sized contaminants from the bulk of feed. One example is the removal of small stones from flour. The bulk of the feed (the flour) goes through the screening means while the larger-sized contaminants (the stones) are retained on the screen. In contrast, the rotary impact separator can be used in scalping operations or operations in which the bulk of the feed does not go through the screen. In the case of adhesive removal from recycled carpet, the volume of adhesive removed is less than 10% of the volume of the cleaned fiber.

In a centrifugal screener, the volume of material inside the unit tends to decease as the feed moves from the inlet end to the exit end. This decrease is due to the removal of a significant portion of the feed through the screen means. However, in the Rotary Impact Separator, it is possible for the volume of material inside the unit to increase as the feed moves from the inlet to the exit end. This is particularly true in the case of fiber processing or carpet recycling wherein the beating and sifting action tends to reduce the bulk density of the material inside the unit, increasing its volume.

Rotary Impact Separators can also be combined with other types of impact and separation equipment described above.

Referring to FIGS. 3A to 3F, possible examples of the end effects 144 are illustrated. It will be appreciated that the end effects 144 illustrated in FIGS. 3A to 3F are not intended to be limiting, as other possible types of end effects 144 are envisioned. Indeed, variations with respect to the illustrated end effects 144 size, structure, construction, configuration, etc. are contemplated. In the illustrated examples, the possible end effects 144 include a paddle (e.g., FIG. 3A), a claw (e.g., FIG. 3B), a knife (e.g., FIG. 3C), a chain (e.g., FIG. 3D), a hammer (e.g., FIG. 3E), a flail (e.g., FIG. 3F), etc.

Figure 3A:
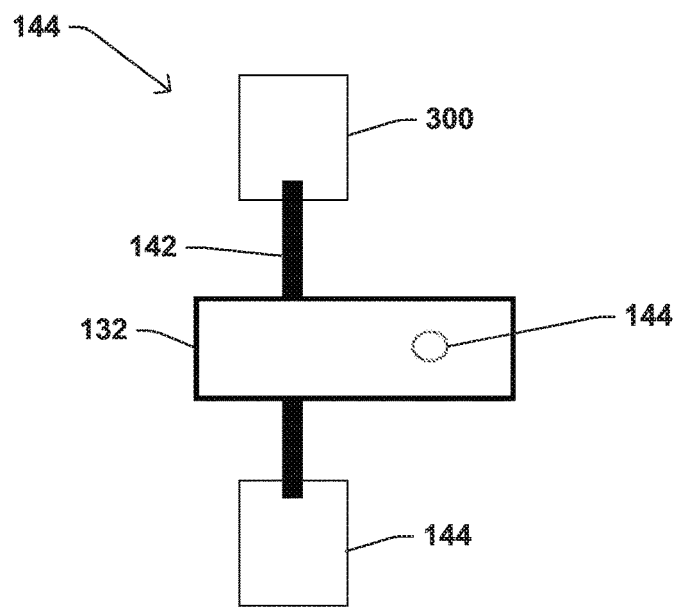
FIG. 3A is an illustration of an example end effect of an example rotary impact separator.

Referring to FIG. 3A, the end effects 144 may include any number of materials. In a possible example, one or more of the end effects 144 may include paddles 300. The paddles 300 may include quadrilateral (e.g., square or rectangular) pieces of flat plate that are mounted to the attachment shaft 142 which may be perpendicular to the shaft 132. The flat dimension of the paddles 300 can be oriented substantially parallel to the shaft 132 or, in some examples, can be twisted at an angle with respect to the shaft 132. Paddles 300 that are twisted in one direction can tend to advance the material 102 down the length of the body 104 from the inlet opening 112 towards the outlet openings 114, 116. Paddles 300 in this orientation are useful near the inlet opening 112 of the body 104 to help move the material 102 towards the outlets 114, 116. Paddles 300 twisted in the opposite direction will tend to retard and/or inhibit movement of the material 102 through the chamber 110. Paddles 300 in this orientation are useful to increase the residence time of the material 102, especially in the sections of the chamber 110 near the middle. Paddles 300 near the exit end of the chamber 103 can help to eject the material 102 from the chamber 110, driving the material 102 towards the outlets 114, 116.

The strength of the flat plate from which the paddle 300 is made may be less than the strength of the attachment shaft 142 onto which the paddle 300 is mounted. In an example of a rigid contaminant in the chamber 110, it may be beneficial for the paddle 300 to bend rather than allowing for the attachment shaft 142 to break. In some examples, the paddles 300 can be removed from the attachment shaft 142 for facile servicing, cleaning, replacement, etc.

Figure 3B:
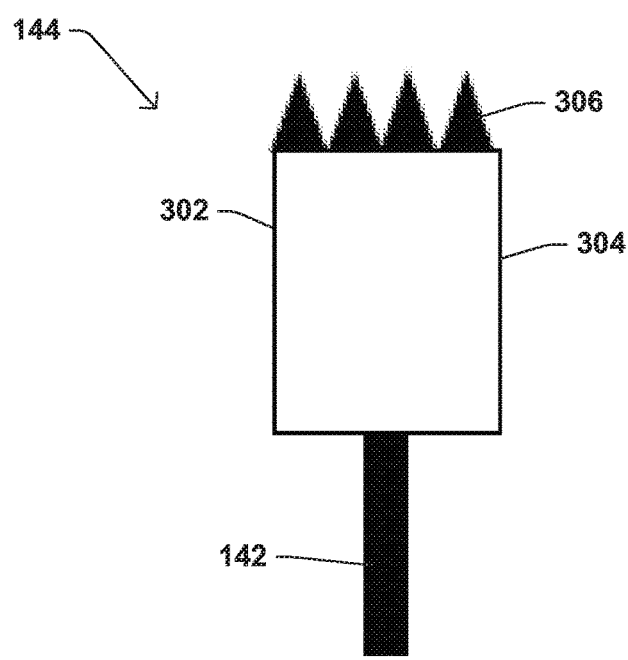
FIG. 3B is an illustration of an example end effect of an example rotary impact separator.

Referring to FIG. 3B, one or more of the end effects 144 may include claws 302. While the paddle may have a flat top edge, the claw may have a claw body 304 (e.g., which may be similar in structure to the paddle 300) with a serrated top edge portion 306 attached to the claw body 304. The claws 302 can be useful for tearing larger pieces of the material 102 (e.g., feed). In some examples, the claws 302 are beneficial for disassembling carpet, and for opening up clumps of fiber for processing. The serrated edge 306 can be cut directly into the paddle material, or it may be a separate piece that is attached to the paddle. In an example, the serrated edge 306 may be made of the same material as the paddle, or it can be made of a hardened material to maintain sharpness and resist abrasion. In an example, a smaller number of large teeth tend to be more useful for the opening up of clumps of fiber. Multiple types and sizes of paddles and claws can be employed in the same machine.

Figure 3C:
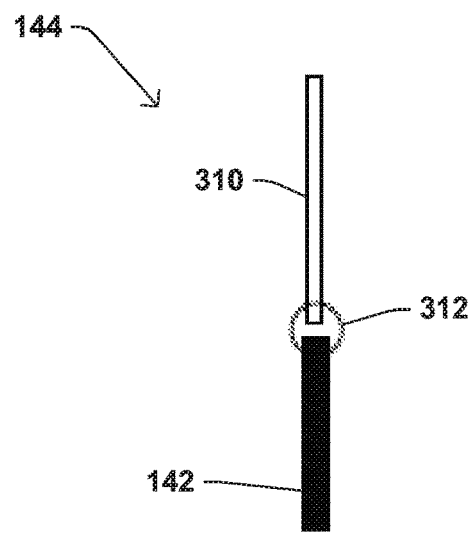
FIG. 3C is an illustration of an example end effect of an example rotary impact separator.

Referring to FIG. 3C, one or more of the end effects 144 may include knives 312. The knives 312 may include pieces of substantially flat material with a length to width ratio of at least two to one. The blade may be mounted to the attachment shaft 142, such as with the knife blade being installed with the thinnest dimension perpendicular to the shaft 142. In an example, the knife 310 may be allowed to pivot with respect to the shaft (e.g., 132 or 142). In such an example, a pivot structure 312 can be provided for attaching the knife 310 to the shaft (e.g., 132 or 142). This pivot structure 312 can allow for the knife 310 to fold back in the event of encountering a rigid contaminant in the material 102, thus avoiding damage to the knife 310. Under normal operating conditions, centrifugal force from the shaft 132 or 142 can keep the knife blade extended radially from the shaft 132 or 142. Alternatively, the knife may be rigidly attached to the attachment shaft 132 or 142 and not allowed to pivot. The narrow edge of the knife blade may impact the material 102 with force, since the impact energy may be concentrated into a small area. This may be useful for the removal of residual adhesive and dirt from fibers.

Figure 3D:
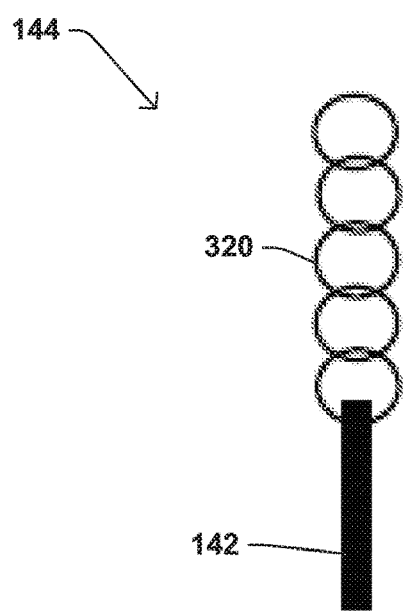
FIG. 3D is an illustration of an example end effect of an example rotary impact separator.

Referring to FIG. 3D, in an example, one or more of the end effects 144 may include chains 320. The chains 320 may be comprised of a connected flexible series of metal links. The chains 320 may be attached to the attachment shaft 142 that extends at right angles to the shaft 132. In an example, while a chain 320 can move in all directions, under normal operating conditions, centrifugal force can cause the chain 320 to extend radially outwardly from the shaft 132. Because of the flexibility of the metal links, the links may be less likely to suffer damage upon encountering a rigid contaminant within the material 102. This property can make chains 320 useful for the initial breakup of rigid feedstock materials. The chains 320 may also be useful for the sorting (e.g., shape sorting) of components in the feed, as the chains 320 drag the material 102 across the screen.

Figure 3E:
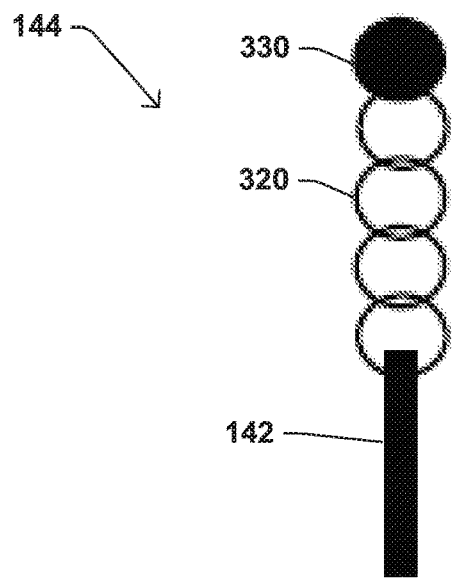
FIG. 3E is an illustration of an example end effect of an example rotary impact separator.

Referring to FIG. 3E, in yet another example, one or more of the end effects 144 may include hammers 330. The hammers 330 may be created by adding a heavy piece of metal to the end of the chain 320. Since the end of the chain 320 may move at a maximum velocity, this hammer head 330 may impact the feed material with great force and momentum, thus helping to disassemble the feedstock materials, and to remove adhering contaminants from the desirable particles and fibers. It may be especially useful in the breaking up of plastics, and in the crushing of friable materials into easily removable fine granules.

Figure 3F:
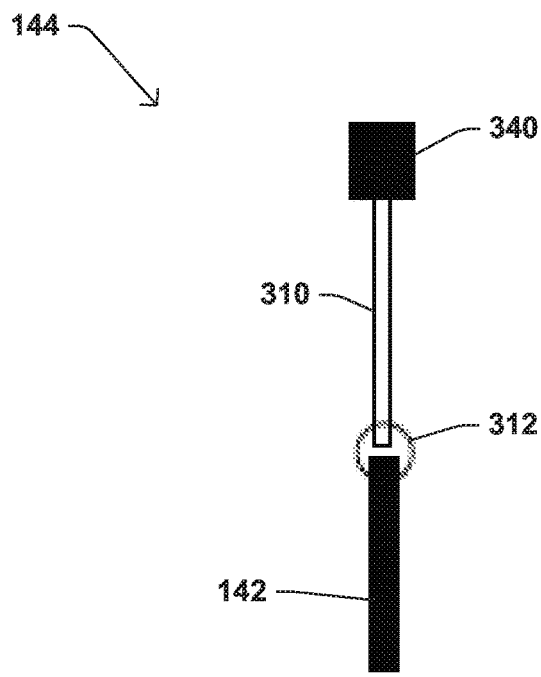
FIG. 3F is an illustration of an example end effect of an example rotary impact separator.
Figure 4:
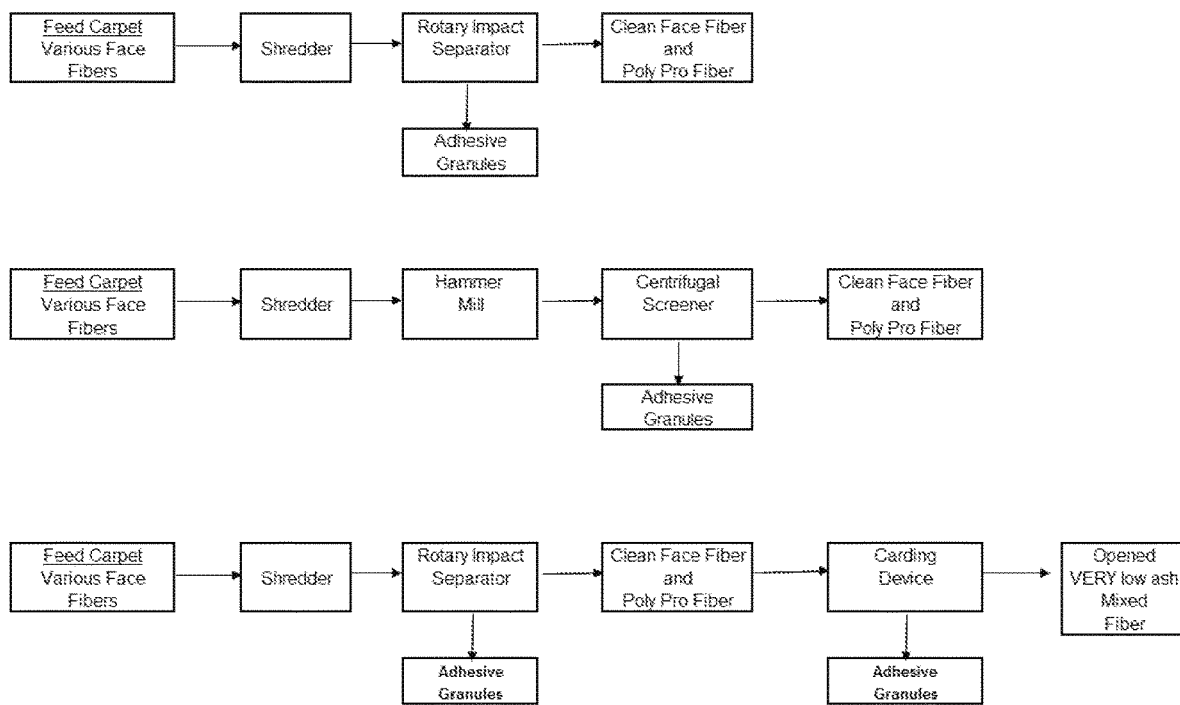
FIG. 4 is an illustration of an example method of recycling a material.
Figure 5:
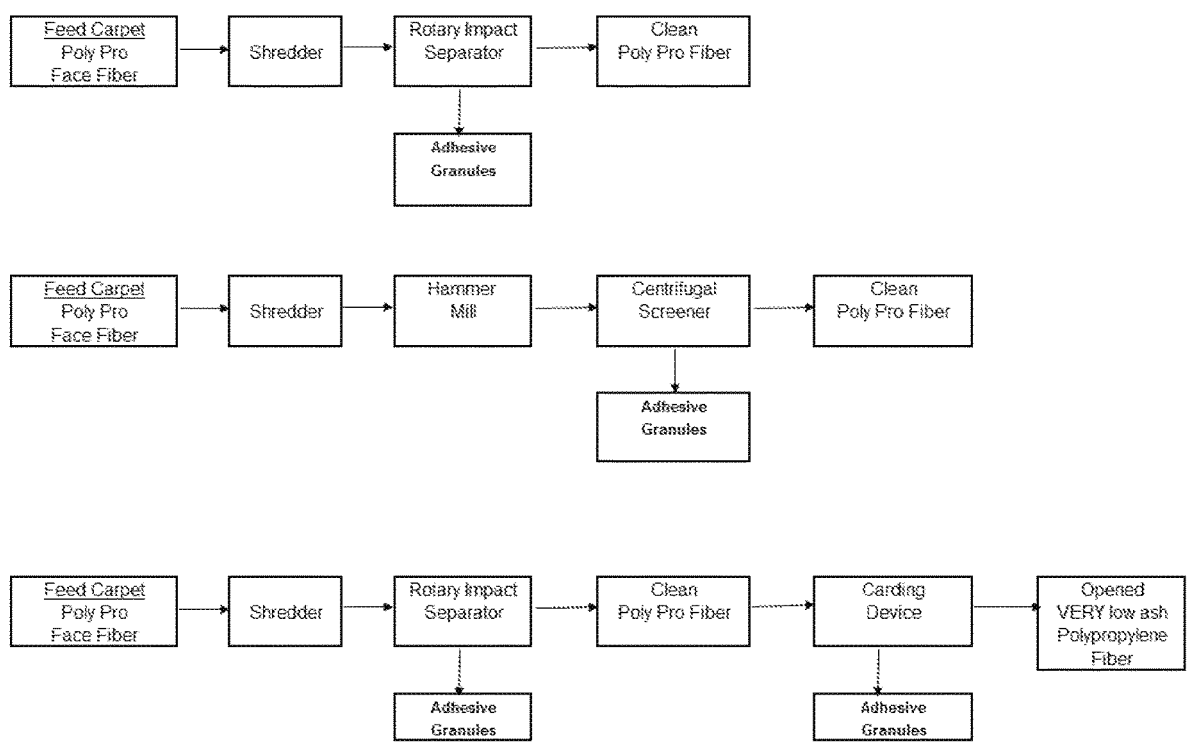
FIG. 5 is an illustration of an example method of recycling a material.
Figure 6:
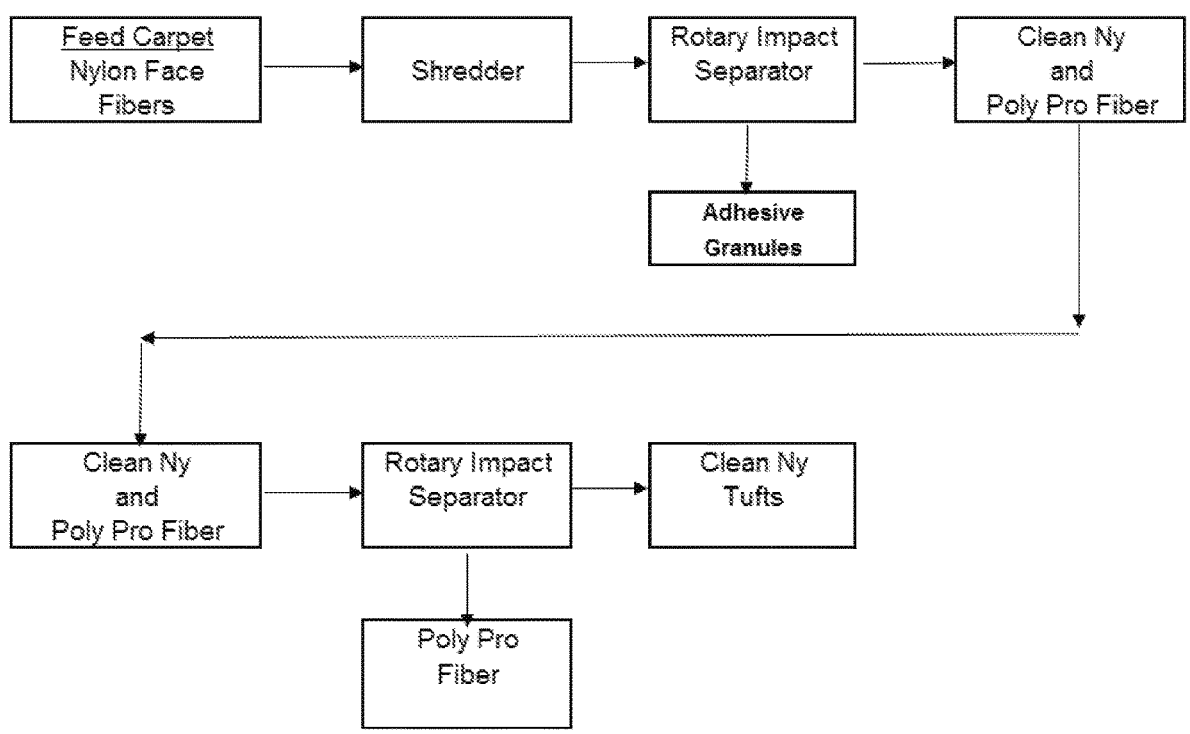
FIG. 6 is an illustration of an example method of recycling a material.
Figure 7:
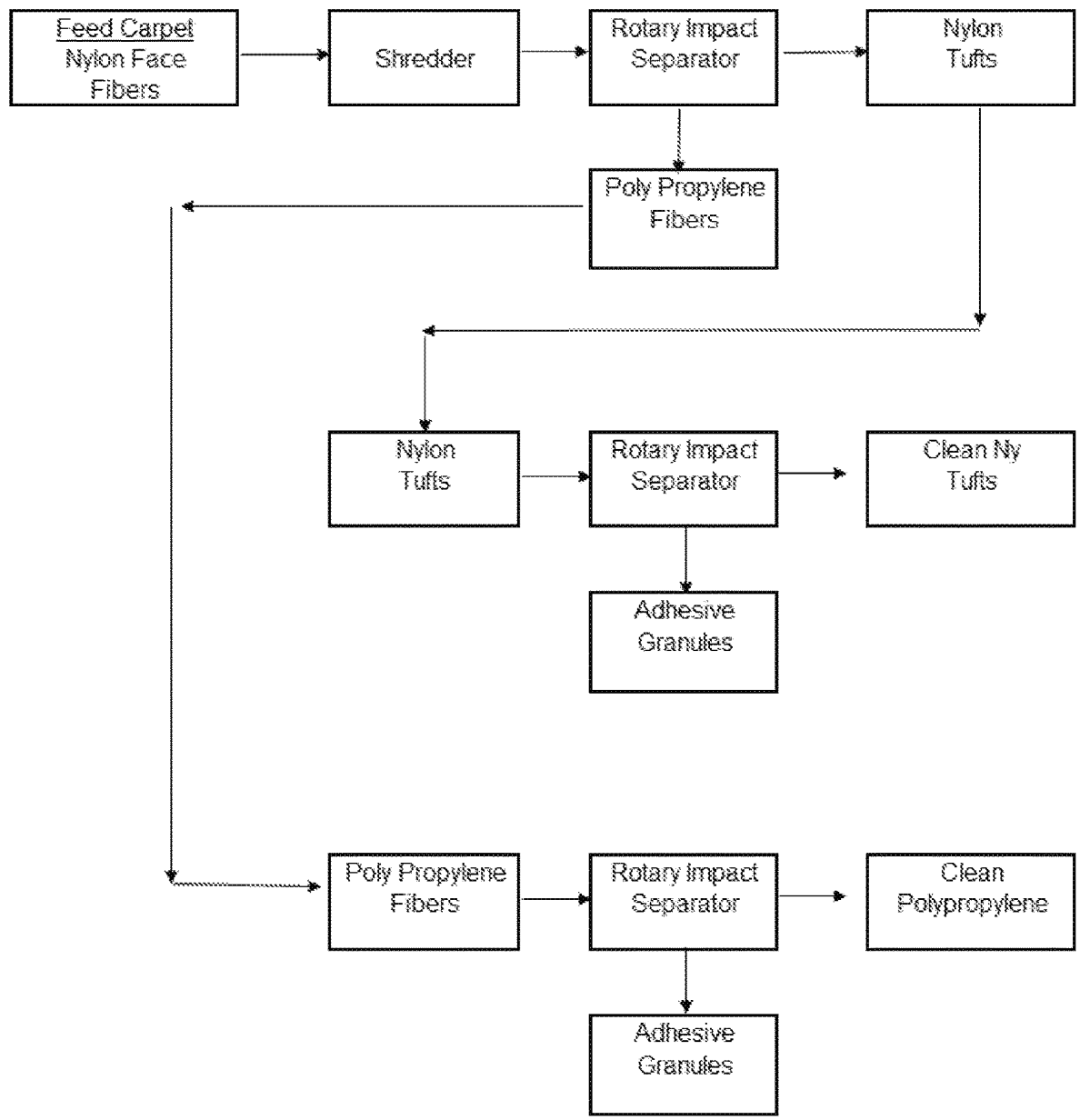
FIG. 7 is an illustration of an example method of recycling a material.
Figure 8:
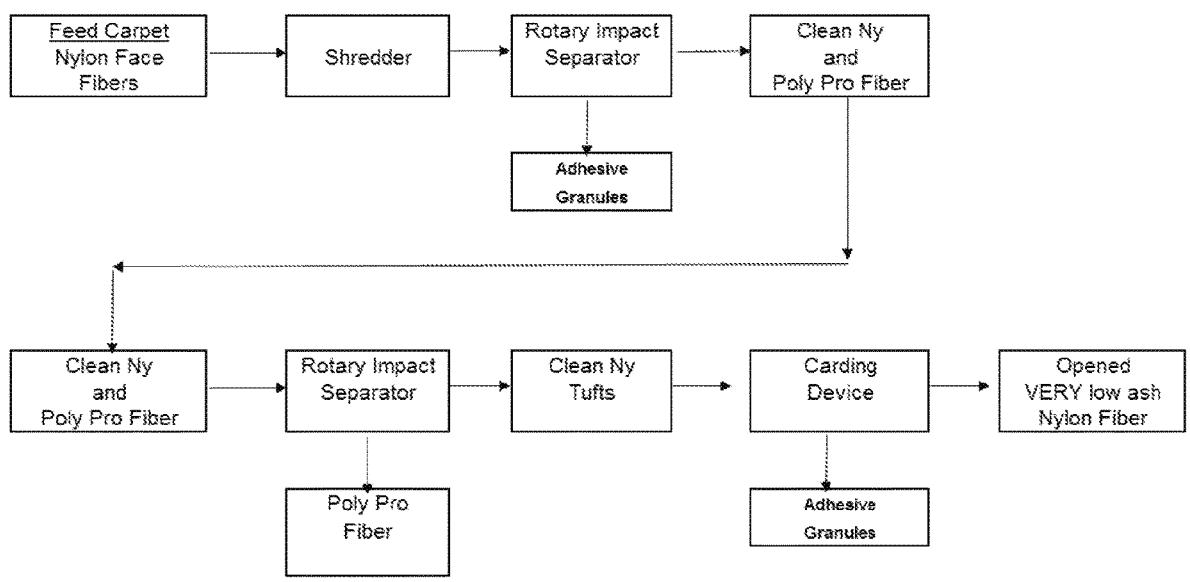
FIG. 8 is an illustration of an example method of recycling a material.
Figure 9:
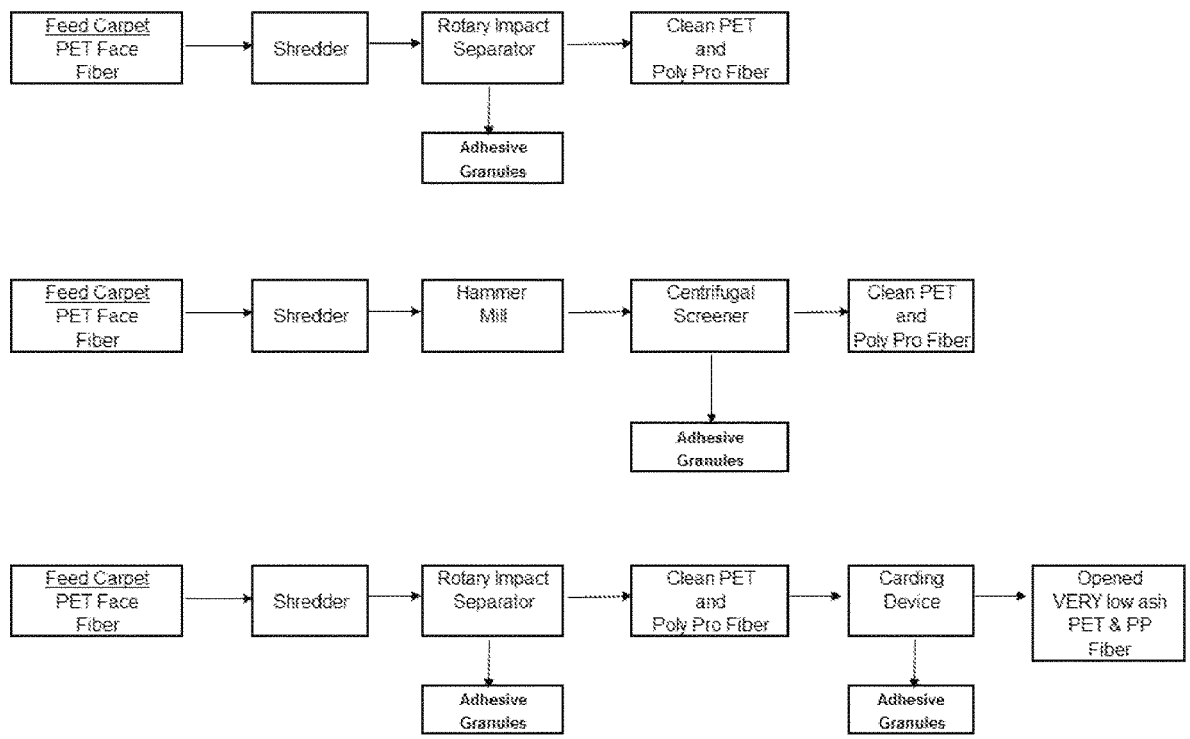
FIG. 9 is an illustration of an example method of recycling a material.
Figure 10:
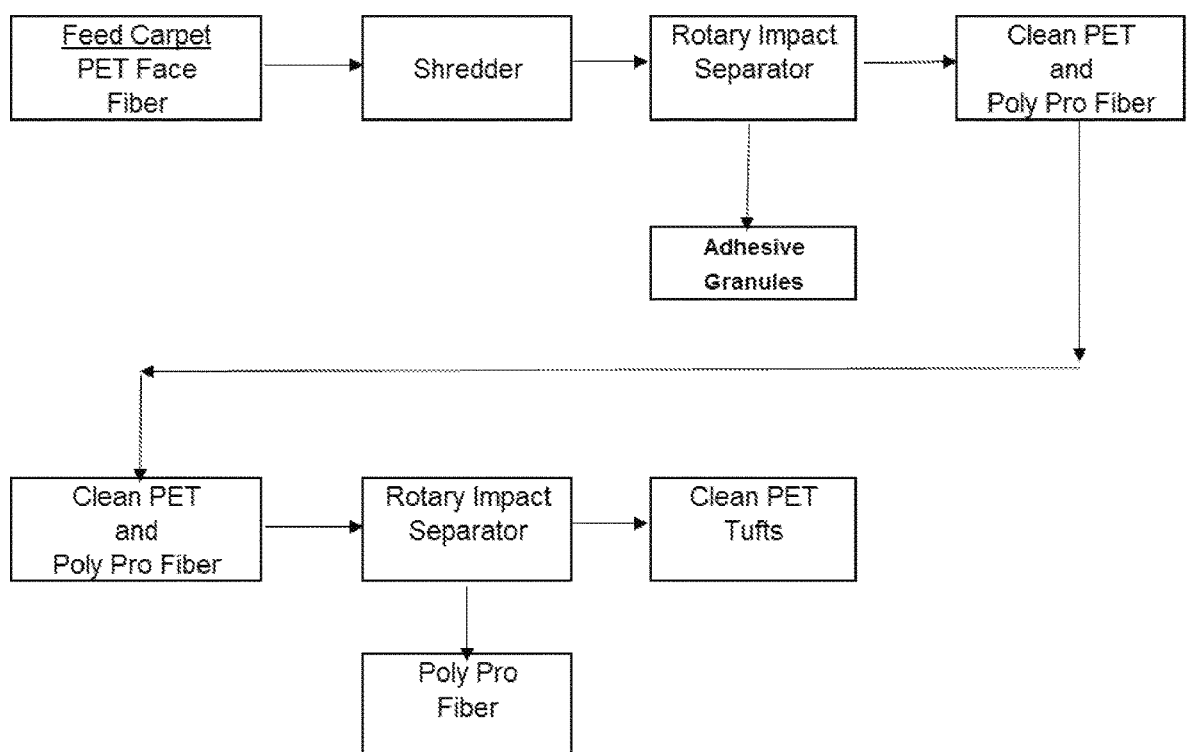
FIG. 10 is an illustration of an example method of recycling a material.
Figure 11:
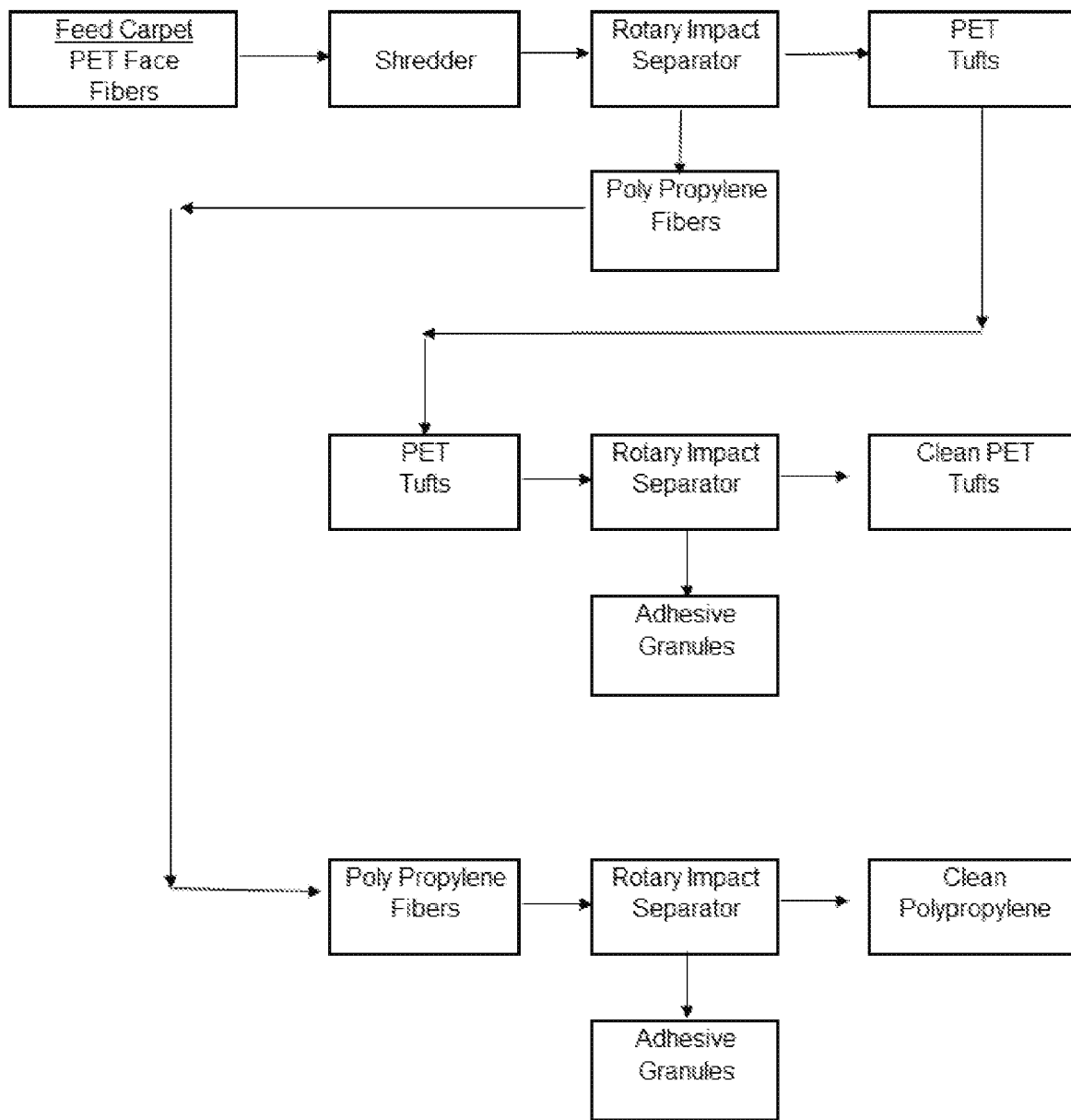
FIG. 11 is an illustration of an example method of recycling a material.
Figure 12:
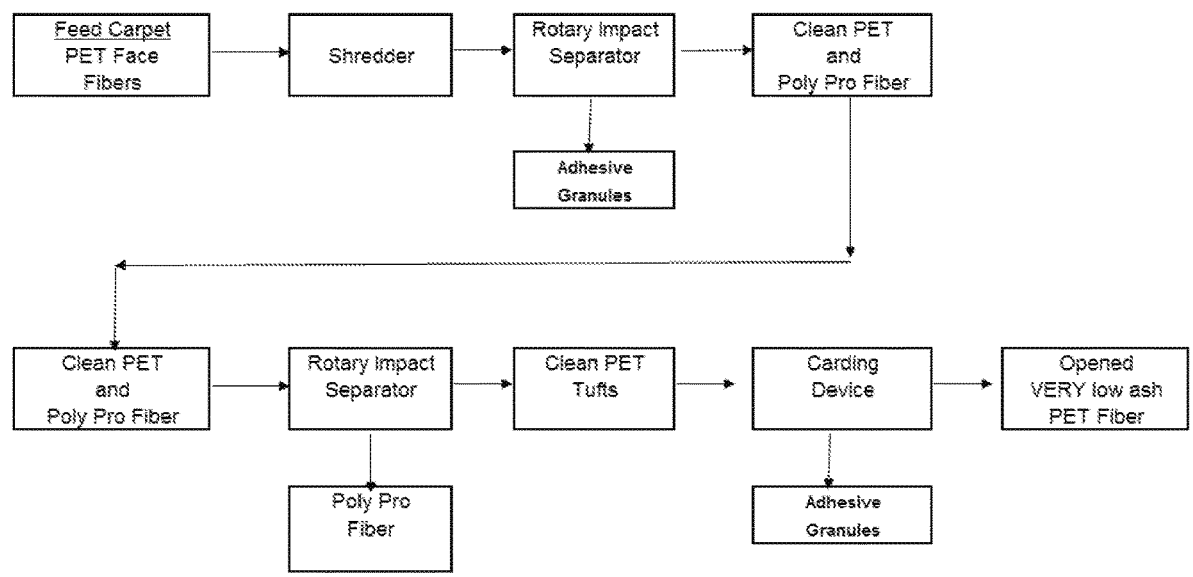
FIG. 12 is an illustration of an example method of recycling a material.
Figure 13:
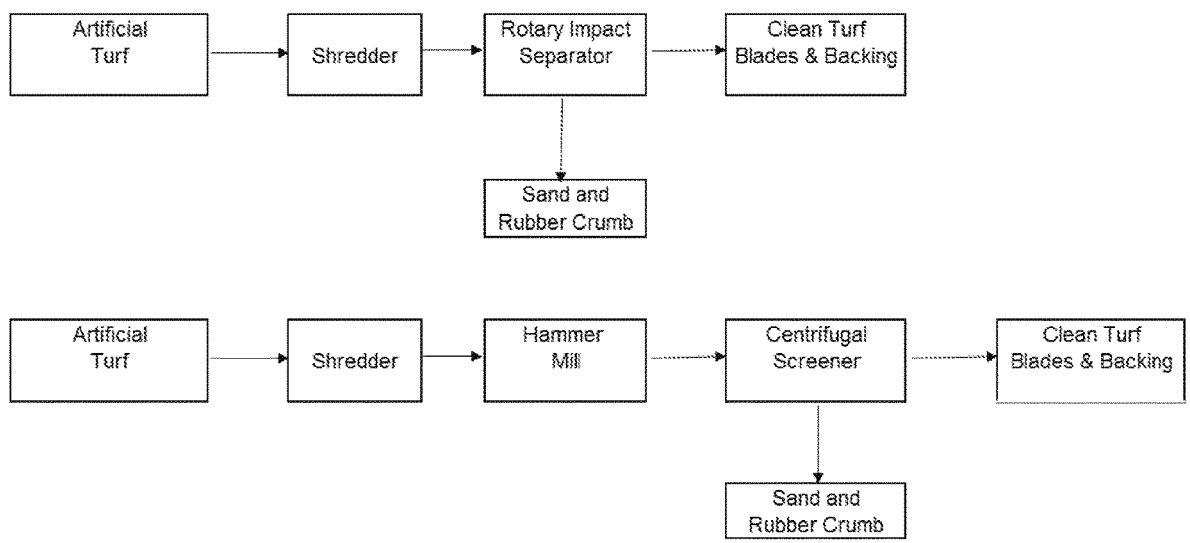
FIG. 13 is an illustration of an example method of recycling a material.
Figure 14:
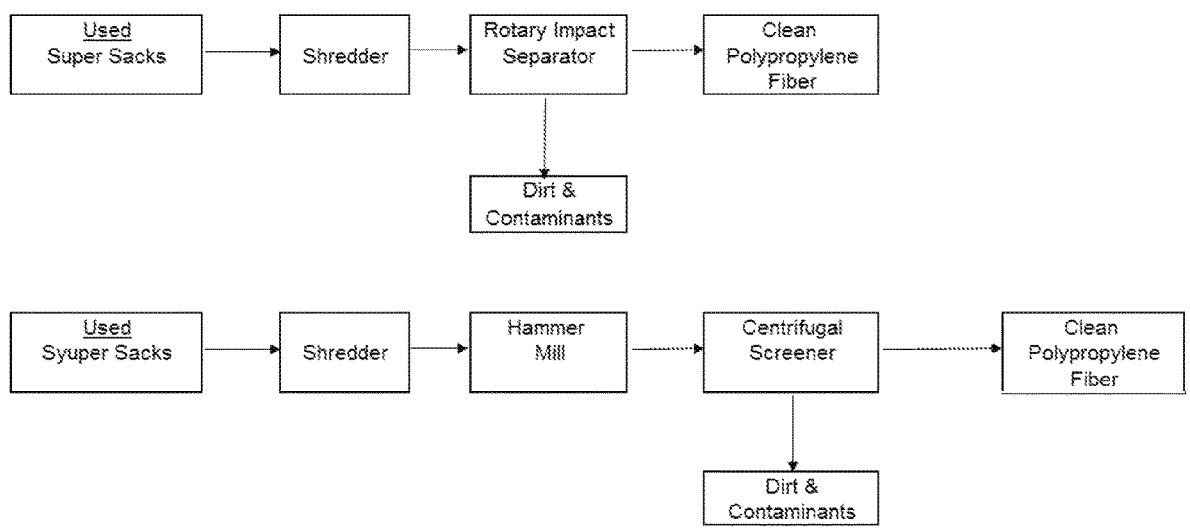
FIG. 14 is an illustration of an example method of recycling a material.
Figure 15:
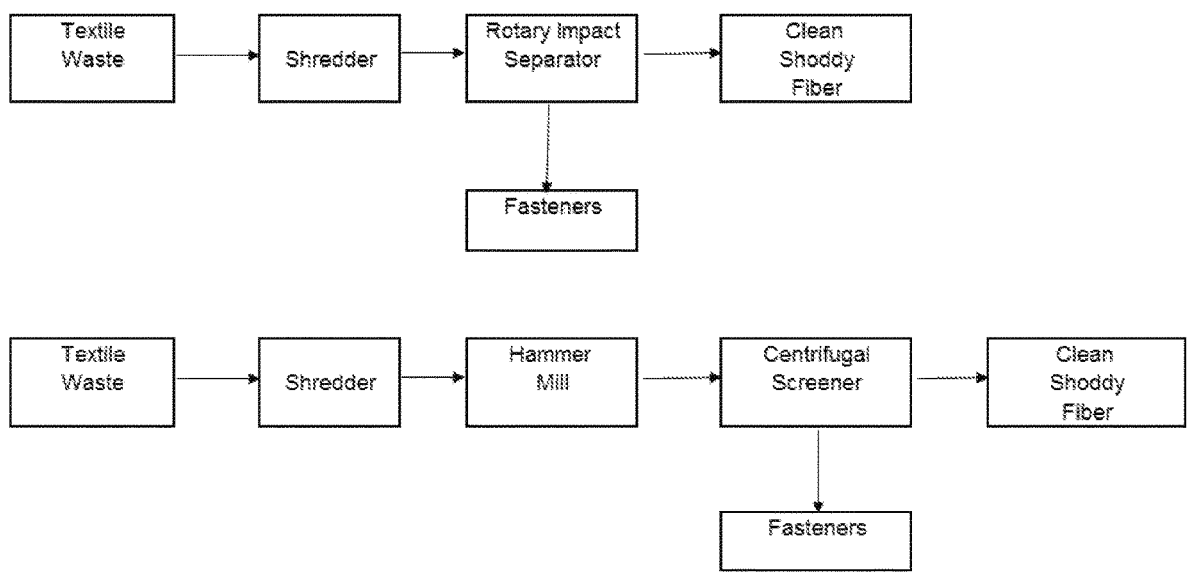
FIG. 15 is an illustration of an example method of recycling a material.

Referring to FIG. 3F, in an example, one or more of the end effects 144 may include flails 340. Flails 340 may be created by adding a heavy piece of metal to the end of a knife 310. Since the end of the knife 310 may move at the maximum velocity, this weighted piece may impact the material 102 with great force and momentum, thus helping to disassemble material 102, and to remove adhering contaminants from desirable particles and fibers. It may be especially useful in the breaking up of plastics, and in the crushing of friable materials into easily removable fine granules.

The spacing between the walls 106 of the body 104 and the ends of the end effects 144 may be designed to allow for the material 102 to pass through the chamber 110. For example, if the spacing is too tight, then the material 102 can jam between the end effects 144 and the walls 106, causing the motor 138 to over-amp. If the spacing is too large, then the material can stagnate and accumulate, thus disrupting pseudo plug flow through the chamber 110. The wall to end effect spacing may not be constant throughout the chamber 110. It may be useful to have a larger spacing near the inlet end of the chamber 110 (e.g., where the feed particles are larger) and a smaller spacing near the exit end of the chamber 110 (e.g., where the particles are smaller).

As described and illustrated herein, a number of processes for recycling carpet, turf, etc. and recovering the resulting product are provided. At least some of these processes are illustrated with respect to process flow diagrams of FIGS. 4 to 15. It will be appreciated that the process flow diagrams of FIGS. 4 to 15 are not intended to be limiting, but are merely examples of possible processes for recovering a resulting product from carpet, turf, etc. Indeed, in some examples, the process flow diagrams of FIGS. 4 to 15 may include extra steps that may not be illustrated, or may not include each of the steps that are illustrated in the figures and described herein.

It is important to remove a significant amount of the adhesive material from the final fibrous material product to maximize the value of the recovered fibrous material. The separation is best accomplished when both the face fiber and the backing materials are in fiber form and the adhesive is in granular form. Preferably at least 50% or more preferably at least 75% or more preferably at least 90% of adhesive is removed from the fibrous material.

For the purposes of this application, "fiber" is defined as having a ratio of the longest dimension of a particle to the shortest dimension of that particle of at least 10 to 1. "Granular" is defined as having a ratio of the longest dimension of a particle to the shortest dimension of that particle of less than 10 to 1.

It may be useful to use a series of impact and/or fiber cleaning devices to further open, clean and align the face fibers for subsequent use.

Recovered fibers are useful for the manufacturing of mats of webs, such as those produced by an air laid or cross-lapping device, followed by needle punching or hydroentanglement or thermo-bonding, as insulation, as filling in pillows and mattresses, as bedding material, as underlayment for flooring or carpeting, and a variety of other industrial and commercial applications.

If the fibrous components are of a single type of fiber, such as polypropylene, the polymer can be extruded into strands or pellets or sheets and used in the manufacture of a wide variety of products. Single component fiber can also be chopped and injection molded.

While it is possible to extrude and/or mold mixed composition fibers, generally the properties of such mixed polymers, even though low in ash, are insufficient to provide sufficient economic incentive for such a process.

If separation of the face fiber from the backing fiber is desired, one approach is to use a hammer mill to perform the initial disassembly of the feedstock carpet, followed by a screening device to separate the face fiber tufts from the backing threads. The hammer mill rotational speed must be properly adjusted so that the hammers have sufficient energy to disassemble the carpet into face fiber tufts and polypropylene threads without substantially opening the face fibers. Intermixing of opened face fiber tufts with the polypropylene threads would make subsequent separation of these two streams much more difficult.

One or more impact devices can be used in series in this step to achieve the desire bond scission. These can be the same type of device or different devices. Optionally, a cooling step can be employed in between impact devices to prevent the generation of excessively high temperatures in the impact devices.

After the impact device breaks the bond between the adhesive and fibrous materials, the face fiber tufts can be separated from the fibrous polypropylene material. Since the twisted tufts are substantially smaller than the long polypropylene threads, the separation can be achieved by various types of screening devices, such as those manufactured by Sweco or Scotts, or Kason. Other options include a trommel screen such as those manufactured by Sherbrooke in Canada or Krause Manufacturing in California. Using a screen with openings of about 0.5 to 2 inches (about 12 to 50 mm), most of the fibrous polypropylene components are retained on the surface of the screen while the bulk of the face fiber tufts, along with a portion of the granular adhesive material passes through the screen to the collection device below.

Larger screen opening will lead to better recovery of tufts, but can also lead to higher levels of polypropylene contamination. Smaller screen openings will decrease polypropylene contamination of the face fiber tufts, but will also reduce yield of face fiber tufts.

One or more screening devices can be used in sequence to achieve the proper degree of separation. These can be the same type of device or a different device. The screen sizes can be the same or different. Optionally, the material passing through a first screening device can be re-processed through a different separation device to recover lost fiber, thereby improving yield of fiber.

The type of energy imparted to the screener mechanism is important. The vertical amplitude of the screen deck should be minimized to avoid inducing the polypropylene fibers from 'diving' into a hole in the screen and reporting to the tuft-rich stream below the screen deck. Two-dimensional sifting type motions are deemed preferable to three-dimensional oscillatory motions. A sweeping-type device, such as those found in a Scotts Turbo separator or a trommel equipped with brushes is useful in moving the polypropylene fibers through the device, and in preventing the blinding of the separation media.

Some impact devices offer the ability to simultaneously break the bond between the adhesive and the fibrous material, and separate the face fiber tufts from the polypropylene fibers without opening the face fiber tufts. One type of machine that can accomplish both of these objectives is a Rotational Impact Separator, as shown in FIG. 1. In this unit, rapidly rotating elements attached to a central shaft impact the feed carpet, breaking the bonds between the adhesive and the fibers, and separating the tufts from the polypropylene backing threads.

By optimizing the rotational speed of the unit, the type and location of rotating elements, and the distance between the screen and the rotating elements, and the size of holes in the screen, one can maximize the separation of tufts from the backing fibers while avoiding excessive opening of the tufts. Tip speeds in the range of about 50 to 250 feet per second (approximately 15 to 75 meters per second) have been found to be useful. The Rotational Impact Separator includes a screen or grate along the bottom plane to separate the tufts from the polypropylene backing fibers. The action of the rotating elements tends to fluff the disassembled carpet components, allowing disengagement of the tufts from the backing fibers, and driving the tufts through the screen means. Meanwhile, the polypropylene backing threads tend to agglomerate, forming a mass too large to pass through the screen. Thus, the majority of the face fiber tufts pass through the screen, while the polypropylene threads are retained on top of the screen. Paddles, gravity (i.e. tipping the unit), centrifugal forces or other means can be employed to discharge the polypropylene from the Rotary Impact Separator. Various dams, baffles, and adjustable gates can also be used to help control residence time within the unit. It will be appreciated that the screen or grate is not limited to being located along the bottom plane, and could be along a side, a top, an end, etc.

The separation of face fiber tufts from polypropylene tufts can occur simultaneously with carpet disassembly, after carpet disassembly but before substantial adhesive removal, or after most of the adhesive has been removed. Regardless of when this separation occurs, it is useful to retain a significant portion of the face fiber in the form of twisted tufts and the polypropylene in the form of longer threads.

After initial removal of some of the adhesive and optionally the separation of tufts and backing, for some product applications, it may be beneficial to remove some of the residual adhesive still attached to the fiber product, thereby lowering the ash content.

The adhesive at this point is in the form of either a) loose granules intermixed and mechanically entangled with the fiber products, or b) granules still attached to the fiber products, either by adhesive or by static or other forces. To remove this adhesive, further mechanical processing of the fiber products is necessary to break the bond between the residual adhesive granules and the fibrous components, and to separate the adhesive granules from the fibrous components.

We have found that a conventional hammer mill is useful in breaking bond between the residual adhesive granules and the fibrous components. The impact of the hammers causes the more brittle adhesive granules to shatter, while the fibrous components remain largely intact. In the case of face fiber tufts, the extreme shearing action in a hammer mill can cause the tufts to "open", changing in appearance from "twisted piles" to randomized individual threads. Such opening tends to disrupt the bond of any residual adhesive, and produces a lower ash final product. At this point in the process, opening of the fibers is not necessarily detrimental.

Hammer mills only break bonds; they provide no means of separation. After hammer milling, another device is required to physically separate the adhesive granules from either the face fiber or polypropylene backing fibers. Such devices include vibratory screens, trommel screens, centrifugal screens, screens such as the Scotts Equipment Turbo Separator, flip-flop screens such as those manufactured by Vibra Snap of Oregon and the like. Alternative devices include aspirators such as those manufactured by Kice Industries of Kansas or Forsbergs of Minnesota. One can employ one or more of the above described devices to achieve the required level of cleanliness in the final product.

A Rotary Impact Separator equipped such as shown in FIG. 1, and equipped with a screen can also be used to simultaneously break the bonds between residual adhesive granules and fibers, and to separate residual adhesive granules from fiber. The rotary elements impact the fiber, breaking the bond between the adhesive granule and the fiber. The granules fall through the screening means, while the cleaned fiber is propelled from the unit by means of paddles, air, gravity etc. Thus, a Rotary Impact Separator accomplishes both the breaking of the fiber-adhesive bond and the separation of the adhesive granules from the fiber in a single unit. In this service, a Rotary Impact Separator would likely be operated at higher rpm (higher tip speed) than in the previous step. At this point in the process, it is not necessary to avoid opening the tufts. In fact, such opening may be an advantage for the removal of residual adhesive and ash.

It is possible to use multiple hammer mills in series, multiple Rotary Impact Separators in series, or a sequence of rotary Impact Separators and hammer mills in various orders to achieve the necessary bond fracture between the fibrous components and the adhesive granules, and to achieve the necessary separation of the fibrous components from the adhesive granules.

Alternatively, residual adhesive granule separation can be achieved in fiber cleaning equipment like those offered by Laroche in France or Trutzler in Germany. In this equipment, the fibrous feed materials are impacted by pins on a rapidly rotating steel roller, breaking the bond between the adhesive and the fibrous components. Simultaneously, air streams and inertia separate granular from fibrous material. Thus both the breaking of bonds between the adhesive granules and the fibers and the actual adhesive granule separation can be combined into a single piece of equipment.

It is possible to achieve sufficient bond breaking and adhesive granule separation in a single unit of this type, or one may choose to use a series of these devices to improve yield and quality. Such devices can optionally employ either internal or external recycle of fiber to maximize fiber recover.

In some cases, it may be useful to first treat one or more of the fibrous components in a Rotary Impact Separator or hammer mill, and then provide further cleaning and separation in a Laroche-type fiber cleaner. Such a strategy can save wear on the rotating pins and lower maintenance costs.

Equipment of this type can also be combined with any of the types of impact and separation equipment described above.

It is important to remove a significant amount of the adhesive material from the fibrous material to product a low ash fibrous product. Low ash fibrous products are especially valuable if the product fiber is to be extruded, pelletized and subsequently molded into an object. For such end uses, ash levels less than 10% and more preferably less than 5% and most preferably less than 2% are useful.

Alternatively, if the fiber is to be used in fiber form, then the ash level may not be as important as fiber length. In such cases, one can choose to minimize fiber cleaning steps that can potentially shorten fiber length, accepting a higher ash level in the final product. Potential uses of separated fiber from carpet include non-woven fabrics, re-enforcement in concrete, insulation, padding, acoustic dampening, and the like. For such end uses, ash levels as high as 8% or 10% or 12% are acceptable.

It should be noted that fiber cleaning means such as a Rotary Impact Separator or Laroche-type equipment tend to remove ash with less fiber damage than higher impact means such as a hammer mill.

In some cases, depending on the end use of the fibrous products, additional impact to remove attached ash granules may not be necessary. We have found this particularly true in the case of polypropylene fibers recovered from a Rotary Impact Separator. The repeated impact these fibers endure in the Rotary Impact Separator have stripped away almost all of the adhesive, leaving a low ash, long fiber polypropylene product already suitable for numerous industrial applications.

In the special case of carpet comprising polypropylene face fiber and polypropylene backing, there may be limited incentive to separate the polypropylene face fiber from the polypropylene backing fiber. In such cases, after the initial disassembly of the carpet, the step of separating the face fiber tufts from the polypropylene backing fibers can be skipped.

Recovered face fibers are useful for the manufacturing of non-woven mats or webs, such as those produced by an air laid or cross-lapping device. Alternatively, the polymer can be extruded into strands or pellets or sheets and used in the manufacture of a wide variety of products. The fiber can also be chopped and injection molded. Compression pellets can be made using a device such as a California Pellet mill.

In a similar fashion, the recovered polypropylene fibers can be use directly in the manufacture of polymeric goods, they can be densified or extruded into pellets for more facile handling, or they can be further purified and used in the manufacture of a wide range of industrial and consumer goods.

As used herein, the term "carpet" is intended to be interpreted broadly to describe a decorative or protective single or multi-component material that may include a backing material, a face fiber material typically comprised of a plurality of fibers made of polyamide, polyester, or polyolefin, and/or an adhesive comprising an organic material and optionally an inorganic filler. In one aspect, the face fiber material may comprise, for example, a nylon or a polyester, or a polyolefin, the backing material a woven polypropylene, and the adhesive an inorganic filled latex. Carpet may also include recycled carpet, post consumer carpet, post industrial carpet, convention carpet, exhibition carpet, non-woven materials, felts, carpet underlayments, nylon, polyethylene terephthalate (PET), polypropylene (PP), a turf material, and/or mixtures thereof. The types of carpet useful according to the application include new carpet, post-industrial carpet, or post-consumer carpet. As used herein, the term "carpet" also refers to post industrial carpet waste streams such as selvage—the edges of carpet that are trimmed off after production and prior to sale. Selvage often has a higher percentage of polypropylene and a lower percentage of face fiber compared to typical carpet. As used herein, the term "carpet" also includes rugs and the residue from carpet shearing processes, often referred to as "carpet carcass". Carpet carcass comprises backing material with some residual fiber that remains attached after mechanical shearing. In addition to traditional indoor carpets and rugs, the term "carpet" also refers to outdoor carpets and rugs, often termed "indoor/outdoor" carpets, and to synthetic turf. Like traditional indoor carpets, these materials include a backing layer to which a face fiber is attached.

Attachment of the face fiber can be achieved using mechanical attachment, an adhesive, or a combination of the above.

Some types of carpet use a mesh-like polypropylene primary and secondary backing. These are easy to disassemble, and are good feedstock for this application.

Some types of carpet include a non-woven polypropylene primary and/or secondary backing. While these types of carpets require more effort to mechanically disassemble, they are quite suitable for this application.

Nylons are, of course, also known as polyamides, and the terms are used herein interchangeably to describe polymers comprised of repeating units joined by amide groups, including without limitation nylon-6 and nylon-6, 6. Polyesters amenable to separation according to the application are polymers having repeating ester linkages and include polyethylene terephthalate (PET) homopolymers and copolymers, polybutylene terephthalate (PBT) homopolymers and copolymers, Polytrimethylene Teraphthalate (PTT) and the like, including those that contain co-monomers such as cyclohexanedimethanol, cyclohexanedicarboxylic acid, and the like. Polyolefins include the various types of polyethylene and polypropylene.

In carpet, the face fiber material is typically oriented with respect to the backing material in a U-shape, in which a fiber is inserted into the backing material and forms a U, with the middle of the fiber in contact with the backing material, and the fiber either cut to a uniform length, called plush pile or cut pile, or left uncut, so-called loop pile. Piles of either form are described herein as face fibers, and are suitably separated from the backing material by the processes according to the application.

Carpets are thus typically formed by the face fiber being anchored into a web of backing material, for example polypropylene threads, that are flexible at ambient temperature. Carpets useful for the inventive process can also include an adhesive such as a latex, for example an SBR (styrene/butadiene/rubber) latex or an EVA (ethylene vinyl acetate) latex, with the latex optionally filled with an inorganic substance such as calcium carbonate as an inorganic filler, provided to add weight to the carpet, with the adhesive helping to maintain the face fiber material attached to the backing material. The carpets may further comprise a polypropylene net-like material or a polypropylene non-woven fabric layer in contact with the adhesive material, also intended to ensure that the face fibers do not inadvertently separate from the backing material during use.

Some carpets are made with a non-woven face fiber layer attached to a polypropylene backing layer with adhesive. Such carpets are also suitable for recycling with this application.

Thus, in one aspect, the application relates to processes for recovering a low-ash fibrous product and polypropylene from a carpet that includes a face fiber material and a backing material, the process comprising: a) applying mechanical force to the carpet to disassemble the carpet and to break the bond between the adhesive and the fiber, and b) applying mechanical force to the fibrous components so as to liberate and separate the face fiber material from residual adhesive granules.

In another aspect, the application relates to processes for separately recovering both face fiber material and optionally polypropylene backing from a carpet that includes a face fiber material and a backing material, the process comprising: a) applying mechanical force to the carpet to disassemble the carpet and to break the bond between the adhesive and the fiber, b) mechanically separating the face fiber tufts from the polypropylene backing fibers, c) applying mechanical force to the face fiber so as to liberate and separate the face fiber material from residual adhesive granules, and optionally d) applying mechanical force to the polypropylene backing fiber so as to liberate and separate the polypropylene fiber material from residual adhesive granules The application further comprises the face fiber material recovered according to the processes of the application. This face fiber material may be in the form of a fiber, or may be extruded to form an article, or may be injection-molded to form an article, or compressed to form an article.

The application further comprises the polypropylene material recovered according to the process of this application. This polypropylene may be in the form of a fiber, or may be extruded or injection molded or compressed to form an article.

The application further comprises the adhesive material recovered according to the process of this application. This granular material may be used, for example, as a fuel, as a weighting component for the manufacture of new carpets, as a binder for various pelletization processes, as a filler or strengthening additive for various composites, or for abrasive blasting.

In one aspect, the carpet fed to the processes according to the application may be provided as pieces of carpet cut or shredded to a size suitable for easy handling. Feed pieces suitable for this process can range in maximum size from as small as 5 cm square to as large as 1 meter square. This cutting or shredding can occur in any type of commercial guillotine or shredder or granulator. The optimum size is a function of the specific requirements of the mechanical disassembly device and the desired product specification. A Rotary Impact Separator, for example, does not substantially decrease the length of the fiber. Thus the longest fibers in the product will be about equal to the longest fibers in the feedstock. In contrast, hammer mills tend to break and shorten fibers in the feedstock, with the amount of breakage increasing as the hole size in the screen decreases.

Long fibers are prized in the manufacture of non-woven products, but excessively long fibers can result in tangling and jamming.

According to the application, after preparatory size reduction, any ferrous contamination may be removed, for example, by magnetic separation. Fines and incidental dirt may likewise be optionally removed at this time. Fines include small pieces of adhesive and short pieces of backing fiber and face fiber. The more intense the size reduction process, the greater the generation of fines. In general, fines represent a loss of potentially good product and should be minimized.

Pieces of carpet at least about 5 square cm and more preferably about 100 square cm, and more preferably 500 or more square cm appear to be suitable for this process.

An additional advantage of this application is that it may have no heating step such as that described in U.S. Pat. No. 8,864,057. This results in less thermal damage to face fiber, preserving its chemical and mechanical properties. The polypropylene is not thermally degraded or converted into a friable substance. Thus, it too can be recovered and reused.

Although it is best in each stage of operation to separate all of a particular component, such a perfect separation is usually not practical nor economical. It is important, therefore, to optimize each separation step depending on the ultimate use of the components and the requirements of the next sequential step in the process. For example, for some types of products while it would be best to remove all of the adhesive granules from the fibrous components, excellent results can be obtained by removing at least 50% and more preferably at least 75% and even more preferably at least 90% of the adhesive granules. In a similar fashion, while for some types of products it would be best to remove all of the polypropylene backing material from the face fiber tufts, it is sufficient to remove most of the polypropylene. Excellent results can be obtained by removing at least 50% and more preferably at least 75% and even more preferably at least 90% of the polypropylene in the feed at this step.

The product fibers may thereafter optionally be further washed, cleaned, combed, carded, aspirated, or screened to further reduce attached contaminants using techniques known to those skilled in the art of fiber cleaning. A float/sink separation may optionally be provided to further reduce contaminants, thus capitalizing on the differences in specific gravity between that of the product fibers and that of the contaminants. This separation can occur at one gravity, or in a higher gravitation field such as that found within a centrifuge. Froth flotation may likewise optionally be used to further reduce contaminants, thus capitalizing on the much higher surface-to-volume ratio of the fibers compared with that of the crushed contaminants. The cleaned fibers may thereafter optionally be formed into granules or pellets either by melting in a unit such as an extruder with an attached pelletizer or a Condux type densifier or by compression in a unit such as a California Pellet Mill, for easier handling and storage. Alternatively the fibers may be used as is, for example for chemical recycling or extrusion or injection molding.

To further elaborate, in one aspect, the process is carried out by size-reducing a part of or even an entire bale of carpet to a size suitable for easy handling using one or more guillotines, shredders or granulators. We note that it is not necessary to remove any baling wire prior to the shredding, since any wire pieces may be removed magnetically after shredding.

The shredding may be carried out in a variety of manners, for example using a twin-shaft shredder such as those made by SSI or Shred Tech, or a single-shaft shredder such as those made by Linder or Komptech or a granulator such as those made by Cumberland or Rapid, or guillotine-type device such as those made by Pirette in France.

The shred top size may, if desired, be less than one meter square, or less than one decimeter square, or less than 5 centimeter square.

Any ferrous contamination may be removed, for example, by magnetic separation of nails, staples, other ferrous contaminants, and the like. Non ferrous metallic contaminants can be removed, for example, by eddy current machines.

Fines and incidental dirt and sand may optionally be removed at this point, if desired, using screening, aspiration, or any other suitable means to remove fines from the shredded material.

If one desires to separate face fibers from backing fibers, it is important to avoid over chopping of the carpet in a manner that substantially reduces the length of polypropylene backing fibers. The separation of face fiber from backing in this application is based on separating components of substantially different morphology (i.e. compact face fiber tufts from long polypropylene backing fibers). If all components are brought to roughly the same size and shape, then such morphological separation becomes more difficult if not impossible.

For simple separation of adhesive granules from fibrous components, without the separation of face fiber from backing fiber, the size of the feedstock becomes less critical. However, over-chopping or over-granulating the feedstock will produce excessive amounts of short fibers which will report to the adhesive granule stream and result in a loss of yield. Yields of face fiber are maximized when the feedstock preparation step does not include significant chopping of the face fiber tufts.

The clean face fiber may optionally be pelletized for easy handling and storage, via an extrusion and pelletizing operation, for example with a Gala underwater pelletizer, or a continuous strand extruder and chopper such as those manufactured by NGR in Georgia and Bay Plastics in Michigan, or compression pelletized for example using a California pellet mill. The face fiber could be agglomerated and densified in a unit such as a Condux agglomerator or a tub densifier. The face fiber could be baled or boxed "as is".

The clean polypropylene fibers can also be packaged "as is" or pelletized for easy handling and storage, via an extrusion and pelletizing operation, for example with a Gala underwater pelletizer, or compression pelletized for example using a California pellet mill. The polypropylene could be agglomerated and densified in a unit such as a Condux agglomerator or a tub densifier.

As will be readily appreciated from the foregoing, advantages of the application include higher recovery of face fiber compared to shearing; higher quality of face fiber compared to simple shredding; low manpower; higher quality face fiber, and the recovery of a usable polypropylene stream.

The granular adhesive material with the optional inorganic filler stream may also find use in a number of applications. Depending on the percentage of inorganic filler used, these granules will have a nominal BTU value of 2,000 to 10,000 BTU per pound. This material can be blended with coal to provide both sulfur capture and heating value. Alternatively, the granular adhesive may utilized as an absorbent for spilled liquids, capable of adsorbing both polar and non-polar liquids.

Alternatively, this material can be used in abrasive blasting applications either solely, or in admixture with other abrasives.

The granular adhesive material can also be used as a filler in various industrial processes, either as an extender and/or as a strength enhancing additive.

This material may also contain residual fiber. This can be recovered in a variety of devices and processes such as Screeners, Aspirators, and Cyclones to highlight a few. The recovered fiber can be further cleaned as a separate stream, discarded or recycled back to the process for recovery. The fiber free adhesive/inorganic may now have other uses.

While this application has been described in terms of carpet recycling, it is apparent that the process (including the use of the Rotary Impact Separator) can also be applied to different feedstocks to separate dirt and contaminants from valuable materials. Feedstocks include but are not limited to:
a) dirty polymer flake, wherein the process separates the dirt, residual label, and residual adhesive from the polymer flake;
b) contaminated shipping containers including "big bags" or "super sacks" and smaller packaging, wherein the process disassembles the container and separates the dirt and residual contained materials from the polymeric sacking fibers; c) contaminated natural fibers such as hemp, cotton or jute, wherein the process separates dirt, clay, sticks, stones, etc. from the fiber; d) mixed textiles, wherein the process separates dirt and fasteners (buttons, zippers, hooks, eyes, and the like) from the fiber components, creating a shoddy material useful in various industrial applications; e) various agricultural products wherein the process separates dirt and unwanted plant parts from desired components, including grains, nuts, and seeds.

In each case, mechanical force is applied to disassemble any aggregates found in the feedstock, mechanical force is applied to break the bond between the contaminants and the desired components, and the contaminants are separated from the desired components. In some examples, some or all of these cleaning operations are carried out in the absence of any added water or chemicals. However, in some possible examples, these cleaning operations may be carried out with added water and/or chemicals. For example, one or more chemicals, such as a fire retardant, a deodorant, etc. may be added, which allows the rotary impact separator to additionally function as both a mixer and a contactor.

EXAMPLES

Comparative Example 1

Nylon 66 face fiber carpet with a woven polypropylene backing was shredded and sieved to remove granules of adhesive from the product fiber. Total yield of fiber was about 50% of the feed to the process. The composition of the recovered fiber mixture was approximately 75% nylon, 18% polypropylene, and 7% residual adhesive. Such a composition is of low value due to the high levels of polypropylene and adhesive admixed with the nylon.

Comparative Example 2

Nylon 6 face fiber carpet was sheared to remove the face fiber, leaving behind a carcass that comprised the backing and a portion of the face fiber. The yield of face fiber was about 23 wt % of the feed to the process, and the face fiber contained about 2 wt % ash. Such low yields are currently economically unattractive.

Comparative Example 3

A sample of Nylon 66 face fiber carpet with a woven polypropylene backing was processed through a Scotts Turbo Separator with a tip speed of about 80 feet per second (24 meters per second). The force was insufficient to separate the adhesive from the fibrous components or to separate the carpet tufts from the polypropylene backing.

Comparative Example 4

A sample of Nylon 6 face fiber carpet with a woven polypropylene backing was processed in a hammer mill with a tip speed of about 375 feet per second (about 115 meters per second) and a screen with 0.5 inch (approximately 1.25 centimeter) diameter holes. The hammer mill adequately separated the face fiber tufts from the polypropylene backing. However, the force was so great that the tufts were opened, preventing down-stream separation of the tufts from the polypropylene backing fiber. Furthermore, the polypropylene backing fibers were significantly reduced in length before they were able to exit the mill through the screen. Finally, after several minutes of operation, the temperature in the mill had increased sufficiently to begin to melt the polypropylene backing threads. The test was aborted at this point.

Comparative Example 5

A sample of PET face fiber carpet with a woven polypropylene backing was processed in a hammer mill with a tip speed of about 375 feet per second (about 115 meters per second) and a screen with 2 inch (approximately 5 centimeter) holes. The hammer mill adequately separated the face fiber tufts from the polypropylene backing without melting the polypropylene. However, inspection of the product stream showed that there was still significant adhesive (latex and calcium carbonate) attached to the face fiber and to the polypropylene backing fiber. In the case of the face fiber, the adhesive was typically found at the bottom of the U shaped piece where the tuft was attached to the backing. After screening, ash measurements showed 9.5% residual ash on the fiber.

Example 1

A sample of cut-pile type carpet with Nylon 66 face fiber and a woven polypropylene backing was subjected to the following steps:
1. Shredded in an SSI shredder with about 4 inch (approximately 100 mm) blades.
2. Processed in a Rotary Impact Separator with a tip speed of about 120 feet per second (about 36 meters per second) and a 0.75 inch (about 19 mm) screen, collecting a tuft-rich stream and a polypropylene-rich stream. The tuft-rich stream contained less than 1 wt % polypropylene.
3. Hammer milled the face fiber tufts in a hammer mill with a 1 inch (approximately 25 mm) screen and a tip speed of about 375 feet per second (about 115 meters per second).
4. Screened the hammer milled face fiber in a Scotts Equipment Turbo Separator with about ⅜ inch (about 9 mm) holes to recover clean face fiber and adhesive granules. The recovered face fiber had less than 1 wt % ash, and less than 1 wt % polypropylene.
5. Processed the polypropylene rich stream from Step 2 in a Rotary Impact Separator with a tip speed of about 240 feet per second (about 72 meters per second) and a 0.25 inch (about 3 mm) screen, collecting a clean polypropylene stream and an adhesive granule stream. The recovered polypropylene had less than 2 wt % ash.

Example 2

A sample of cut-pile type carpet with Nylon 6 face fiber and a woven polypropylene backing was subjected to the following steps:
1. Shredded in an SSI shredder with 6 inch (about 150 mm) blades
2. Processed in a Rotary Impact Separator with a tip speed of about 120 feet per second (about 36 meters per second) and a 0.75 inch (about 19 mm) screen, collecting a tuft-rich stream and a polypropylene-rich stream.
3. Processed the tuft-rich stream from Step 2 in another Rotary Impact Separator with a tip speed of about 240 feet per second (about 72 meters per second) and a 0.125 inch (about 3 mm) screen, collecting a clean nylon face fiber stream and an adhesive granule stream. The recovered face fiber had less than 1 wt % ash and less than 1 wt % polypropylene.
4. Processed the polypropylene rich stream from Step 2 in a Rotary Impact Separator with a tip speed of about 240 feet per second (about 72 meters per second) and a 0.125 inch (about 3 mm) screen, collecting a clean polypropylene stream and an adhesive granule stream. The recovered polypropylene had less than 2 wt % ash.

Example 3

A sample of continuous loop type carpet with polypropylene face fiber and a woven polypropylene backing was subjected to the following steps:
1. Shredded in an SSI shredder with 2 inch (about 50 mm) blades and shredded in an SSI shredder with 1 inch (about 25 mm) blades, and re-shredded in an SSI shredder with 1 inch (about 25 mm) blades. The additional shredding steps minimized long strings of face fiber yarn, and prevented fouling of down-stream equipment.
2. Processed in a Rotary Impact Separator with a tip speed of about 120 feet per second (about 36 meters per second) and a 0.25 inch (about 6 mm) screen, collecting a polypropylene-rich stream and an adhesive granule rich stream.
3. Screened in a Scotts turbo sifter with about 9 mm (⅜ inch) holes to remove residual loose adhesive granules. Almost no adhesive was recovered from this step, indicating that almost all the adhesive granules had been removed in the previous step.
4. Recovered polypropylene fiber with less than 1.5 wt % ash.

Example 4

A sample of cut-pile type carpet with polyester face fiber and a woven polypropylene backing was subjected to the following steps:
1. Shredded in an SSI shredder with 6 inch (about 150 mm) blades
2. Processed in a Rotary Impact Separator with a tip speed of about 120 feet per second (about 36 meters per second) and a 0.75 inch (about 19 mm) screen, collecting a tuft-rich stream and a polypropylene-rich stream.
3. Processed the tuft-rich stream from Step 2 in a Rotary Impact Separator with a tip speed of about 240 feet per second (about 72 meters per second) and a 0.125 inch (about 3 mm) screen, collecting a clean face fiber stream and an adhesive granule stream. The recovered face fiber had less than 1 wt % ash and less than 1 wt % polypropylene.
4. Processed the polypropylene rich stream from Step 2 in Scotts Turbo Separator to remove loose adhesive granules and dust. The recovered polypropylene had less than 1 wt % ash.

Example 5

A sample of cut-pile type carpet with polyester face fiber and a woven polypropylene backing was subjected to the following steps:
1. Shredded in an SSI shredder with 6 inch (about 150 mm) blade
2. Processed in a Rotary Impact Separator with a tip speed of about 200 feet per second (about 60 meters per second) and a 0.125 inch (about 3 mm) screen, collecting a fiber-rich stream and an adhesive-rich stream. The mixed fiber product stream contained less than 2 wt % ash.
3. The adhesive-rich stream was further processed in a rotary Screener recovering the majority of the residual fiber. The fiber rich stream from the rotary Screener was recycled back to the Rotary Impact Separator to improve the fiber yield. This recovery step is optional.

Example 6

A sample of cut-pile type carpet with Nylon 66 face fiber and a woven polypropylene backing was subjected to the following steps:
1. Shredded in an SSI shredder with 6 inch (about 150 mm) blades
2. Processed in a Rotary Impact Separator with a tip speed of about 120 feet per second (about 36 meters per second)

and a 0.75 inch (about 19 mm) screen, collecting a tuft-rich stream and a polypropylene-rich stream.

3. Processed the tuft-rich stream from Step 2 in a Laroche fiber cleaning line including pin rollers and step cleaners. The product was a fully opened fiber. The recovered face fiber had less than 1 wt % ash and less than 1 wt % polypropylene.

4. Processed the polypropylene rich stream from Step 2 in hammer mill followed by a Sweco screener with 0.125 inch (about 3 mm) holes to remove loose adhesive granules and dust. The recovered polypropylene had less than 1 wt % ash.

Example 7

A sample of cut-pile type carpet with Nylon 66 face fiber and a woven polypropylene backing was subjected to the following steps:

1. Shredded in an SSI shredder with 6 inch (about 150 mm) blades

2. Processed in a Rotary Impact Separator with a tip speed of about 120 feet per second (about 36 meters per second) and a 0.75 inch (about 19 mm) screen, collecting a tuft-rich stream and a polypropylene-rich stream.

3. Processed the tuft-rich stream from Step 2 in a Rotary Impact Separator with a tip speed of about 240 feet per second (about 72 meters per second) and a 0.125 inch (about 3 mm) screen, collecting a low ash nylon product and an ash-rich fines stream. The recovered face fiber had less than 2 wt % ash and less than 1 wt % polypropylene.

4. Processed the polypropylene rich stream from Step 2 in a rotary Impact Separator with a tip speed of about 240 feet per second (about 72 meters per second) and a 0.125 inch (about 3 mm) screen, collecting a low ash polypropylene stream and an ash-rich fines stream. The recovered polypropylene had less than 1 wt % ash.

Example 8

A sample of cut-pile type carpet with polyester face fiber and a woven polypropylene backing was subjected to the following steps:

1. Shredded in an SSI shredder with 6 inch (about 150 mm) blades

2. Processed in a Rotary Impact Separator with a tip speed of about 120 feet per second (about 36 meters per second) and a 0.75 inch (about 19 mm) screen, collecting a tuft-rich stream and a polypropylene-rich stream.

3. Processed the tuft-rich stream from Step 2 in a Laroche fiber cleaning line including pin rollers and step cleaners. The product was a fully opened fiber. The recovered face fiber had less than 5 wt % ash.

4. Processed the polypropylene rich stream from Step 2 in hammer mill followed by a Sweco screener with 0.125 inch (about 3 mm) holes to remove loose adhesive granules and dust. The recovered polypropylene had less than 5 wt % ash.

5. Blended a portion of the longer polypropylene fibers with the shorter opened PET fibers and created a non-woven mat using a Laroche needle punching device.

Example 9

A sample of artificial turf comprising polypropylene face fiber (the grass 'blades'), and a woven polypropylene backing was processed according to the application.

Note that artificial turf feed to a recycling operation can contain extremely high levels of sand and ground rubber contamination. This material, called "in-fill", is applied to the artificial turf during installation in order to stabilize the turf and to help hold it in place. It is critical to remove this in-fill during recycling to create a clean polymer stream. Water, biological material, and other field treatment chemicals tend to bind a significant portion of the in-fill to the polymeric fibers.

The sample was:

1. Shredded in a Weima single shaft shredder

2. Screened in a trommel to remove gross sand and rubber infill. At this point, the sample contained about 40 wt % ash. This ash is the sum of the sand in the in fill, the filler in the ground rubber in the in fill, and the inorganic filler in the polymeric fibers.

3. Processed in a Rotary Impact Separator with a tip speed of about 120 feet per second (about 36 meters per second) and a 0.25 inch (about 6 mm) screen, collecting a sand and rubber rich stream and a polypropylene-rich stream.

The resultant fiber product had less than 2% ash. This product is suitable for extrusion into pellets or sheet.

Example 10

A sample of artificial turf comprising polyethylene face fiber (the grass 'blades'), and a woven polypropylene backing was processed according to the application. The turf "as received" contained a high level of in fill.

The sample was:

1. Shredded in a Weima single shaft shredder to a top size of about 6 inches (about 150 mm).

2. Processed in a Rotary Impact Separator with a tip speed of about 12 feet per second (about 3.6 meters per second) and a 0.5 inch (about 13 mm) screen, collecting an ash and rubber granule-rich stream and a polypropylene fiber-rich stream.

3. Processed polypropylene fiber-rich stream in a Rotary Impact Separator with a tip speed of about 120 feet per second (about 36 meters per second) and a 0.25 inch (about 6 mm) screen, collecting a clean polypropylene-rich stream, and a fines stream rich in sand and rubber granules.

The resultant polypropylene fiber product had less than 2% ash. This product is suitable for extrusion into pellets or sheet.

Example 11

A sample of used "super sack" or "big bag" material contaminated with chemicals was processed according to the application. The super sack is composed largely of interwoven polypropylene fibers. Dirt and prior bag contents were ground into the fabric of the sack, resulting in contamination of the polymer.

The sample was:

1. Shredded in a single shaft shredder to a top size of about 3 inches (about 50 mm).

2. Processed in a Rotary Impact Separator with a tip speed of about 120 feet per second (about 36 meters per second) and a 0.125 inch (about 3 mm) screen, collecting a contaminant-rich stream and a polypropylene fiber-rich stream.

What is claimed is:

1. A process for recovering a product from a carpet, the process comprising:
  (a) supplying the carpet from a source to a separator comprising a body, the body extending along a body axis and including one or more walls, the body being substantially hollow such that the one or more walls define a chamber that is sized to receive the carpet from the source, the body having an inlet opening through which the carpet is received from the source;
(b) applying mechanical force to the carpet within the body to break a bond between an adhesive and a face fiber material of the carpet while maintaining the face fiber material at least partially in tuft form by rotating an impactor within the chamber and causing end effects of the impactor to contact the carpet;
(c) mechanically separating, within the body, at least 50% of the face fiber material from a polypropylene fiber;
(d) applying mechanical force, within the body, to the face fiber material to separate the face fiber material from the adhesive;
(e) applying mechanical force, within the body, to a backing material of the carpet to separate the backing material from residual adhesive granules; and
(f) recovering, from the carpet, the face fiber material and the polypropylene fiber from the body.

2. The process of claim 1, wherein the face fiber material comprises one or more of: a polyamide, a polyester, or a polyolefin.

3. The process of claim 1, wherein steps a) and b) are carried out in a same apparatus.

* * * * *